United States Patent
Gross et al.

(10) Patent No.: US 6,972,315 B2
(45) Date of Patent: Dec. 6, 2005

(54) ENZYME-CATALYZED POLYCONDENSATIONS

(76) Inventors: Richard A. Gross, 16 Northern Pkwy., Plainview, NY (US) 11803; Ajay Kumar, 1210 Camino Village Dr., Apt. 4401, Houston, TX (US) 77058; Bhanu Kalra, 1210 Camino Village Dr., Apt. 4401, Houston, TX (US) 77058

( * ) Notice: Subject to any disclaimer, the term of this patent is extended or adjusted under 35 U.S.C. 154(b) by 245 days.

(21) Appl. No.: 10/199,434

(22) Filed: Jul. 19, 2002

(65) Prior Publication Data

US 2004/0019178 A1 Jan. 29, 2004

(51) Int. Cl.⁷ ............................................. C08G 63/02
(52) U.S. Cl. ................. 528/274; 252/174.12; 424/417; 424/490; 510/228
(58) Field of Search ............................... 424/417, 490; 510/228; 528/274; 252/174.12

(56) References Cited

U.S. PATENT DOCUMENTS

| | | | |
|---|---|---|---|
| 4,791,168 A | 12/1988 | Salatin | |
| 4,794,147 A | 12/1988 | Savino | |
| 5,270,421 A | 12/1993 | Dordick | |
| 5,474,915 A | 12/1995 | Dordick | |
| 6,225,372 B1 * | 5/2001 | Lykke et al. | ............. 523/201 |

FOREIGN PATENT DOCUMENTS

WO      WO 94/12652     6/1994

OTHER PUBLICATIONS

Patil et al., Enzymatic Synthesis of a Sucrose–containing Linear Polyester in nearly Anhydrous Organic Media, Biotechnol. Bioeng. 37, 639 (1991).
Park et al., Biotechnol. Bioeng. 70, 208 (2000).
Kim and Dordick, Combinatorial Array–Based Enzymatic Polyester Synthesis, Biotechnol. Bioeng. 76(3), 200 (2001).
Uyama et al., Regioselective Polymerization of Sorbitol and Divinyl Sebacate using Lipase Catalyst, Chem. Lett. 800 (2000).
Uyama et al., Regioselective Polymerization of Divinyl Sebacate and Triols using Lipase Catalyst, Macromol. Rapid Commun. 20, 171 (1999).

* cited by examiner

Primary Examiner—Terressa Boykin
(74) Attorney, Agent, or Firm—Technoprop Colton LLC

(57) ABSTRACT

A method for enzymatic condensation polymerization by combining a preselected quantity of an enzyme, a diol and/or a polyol, and a diacid in a reaction vessel; heating the reaction vessel containing the enzyme, the diol or polyol, and the diacid to a preselected temperature; and maintaining the reaction vessel containing the enzyme, the diol and/or polyol, and the diacid at the preselected temperature for a preselected time, thereby producing a condensation polymer.

69 Claims, 9 Drawing Sheets

ENZYME-CATALYZED POLYCONDENSATIONS

BACKGROUND OF THE INVENTION

1. Technical Field

The present invention generally relates to enzymatic processes for making polymers and more specifically relates to enzyme catalyzed polymerization processes for making high molecular weight polymers such as polyol-containing polyesters and other compositions of matter.

2. Prior Art.

Polyesters typically are produced by chemically catalyzed reactions using elevated temperatures, strong acids, and long reaction times. Chemical processes with competitive reactions such as esterification, transesterification, and hydrolysis often limits the molecular weight of the product formed and also broadens the polydispersity. Unwanted side products such as cyclic esters are also obtained in significant amounts. Also, it is difficult to remove the catalyst from the system. Removal of water during the reaction is performed to force the reaction equilibrium towards products. However, as shown in European Patent No. EP-A-0425201, the activity of residual chemical catalysts in products often leads to loss in product molecular weights upon storage or during processing.

Activated esters have been used in regioselective polymerization reactions, as shown by Patil et al., Enzymatic Synthesis of a Sucrose-containing Linear Polyester in nearly Anhydrous Organic Media, Biotechnol. Bioeng. 37, 639 (1991). This process used the protease proleather in pyridine (45° C., 5 days) to synthesize a polyester from sucrose and the activated sebacate bis(2,2,2-trifluoroethyl) diester. This sucrose-based polyester, after fractionation by precipitation, was formed in 20% yield with an average degree of polymerization (d.p.) of 11.

Recently, as shown in Park et al., Biotechnol. Bioeng. 70, 208 (2000), Opticlean M375 (subtilisin from Bacillus licheniformis) was used to synthesize the polymer building blocks sucrose 1'-O-adipate and trehalose-6'-O-adipate in anhydrous pyridine. Similarly, Novozyme-435 was used to catalyze the synthesis of the polymer building blocks sucrose 6,6'-O-divinyladipate and trehalose 6,6'-O-divinyladipate in acetone. These diesters from activated diacids were then used as precursors in polycondensation reactions with various diols. The polymerizations were catalyzed by Novoyzme-435 in organic media. By this two-step strategy linear polyesters were formed.

The lipase from Candida antarctica was also found to be active in acetonitrile and was capable of catalyzing the polycondensation between carbohydrates or aliphatic/aromatic diols with C-3 to C-10 straight chain activated divinyl diesters, as shown in Kim and Dordick, Combinatorial Array-Based Enzymatic Polyester Synthesis, Biotechnol. Bioeng. 76(3), 200 (2001). The maximum $M_w$ of the polymers obtained was 20 000. Similarly, sugar containing polyesters were synthesized by polymerizing sorbitol with divinyl sebacate using the lipase from Candida antarctica (75% by wt) at 60° C. in acetonitrile, as shown in Uyama et al., Regioselective Polymerization of Sorbitol and Divinyl Sebacate using Lipase Catalyst, Chem. Lett. 800 (2000). The product formed in 64% yield after fractionation had an $M_n$ of 9 800. Similarly, using activated diesters in acetonitrile, the regioselective polymerization of mannitol and meso-erythritol were performed giving sugar-based polyesters.

The polymerization of glycerol with the activated divinyl sebacate in bulk at 45° C. and 60° C. was also studied using the lipase from Candida antarctica as shown in Uyama et al., Regioselective Polymerization of Divinyl Sebacate and Triols using Lipase Catalyst, Macromol. Rapid Commun. 20, 171 (1999). The product was obtained in 60–70% yields after fractionation with a $M_n$ and $M_w/M_n$ of 3518 and 5.4, respectively. The regioselectivity of glycerol acylation during the polymerization was 74% at the primary positions. By using lipase MM, a polymer from glycerol and the activated divinyl sebacate that consisted of exclusively 1,2- and 1,3-disubstituded units was formed. In contrast, using lipase PC, 1,3-disubstituted and trisubstituted units were formed during the polymerization. Temperature was found to influence the regioselectivity of these reactions. For example, when the Novozyme-435 (75% by weight) was used to catalyze the polymerization of glycerol with divinylsebacate at 45° C. for 8 hr, almost exclusive formation of the 1,3-disubstituted units was found in the solvent fractionated product (45% yield, $M_n$ and $M_w/M_n$ of 1000 and 2.2).

Lipase also has been used for polycondensations without activating groups. In WO 94/12652 to Taylor, the formation of low number average molecular weight polyesters by direct condensation of diacids and diols in solventless conditions at 40–100° C. is demonstrated. However, this publication does not teach methods by which carbohydrates can be partially or completely solubilized in ternary mixtures to produce nearly linear high molecular weight products, does not teach methods by which high molecular weight products can be formed, and does not teach methods that allow the simultaneous polymerization of lactones or anhydrides during condensation polymerizations.

Other generalized methods for polymerizations include U.S. Pat. No. 5,474,915 to Dordick for a method for making polysugar acrylates using hydrolytic enzymes, U.S. Pat. No. 5,270,421 to Dordick for sugar based polymers, U.S. Pat. No. 4,791,168 to Salatin for incorporating a long-chain carboxylic acid of at least 50% by weight of the carboxylic acid component used to make polyester resins which are further incorporated into polyurethane resins, and U.S. Pat. No. 4,794,147 to Savino for water-dispersible polyurethane resins having polyether sidechains.

BRIEF SUMMARY OF THE INVENTION

This present invention is an enzymatic process for making polyol-containing polyesters as well as novel compositions of matter. Briefly, the process is a one-step enzyme-catalyzed polymerization of various acid, hydroxyl, and/or carbohydrate building blocks conducted in the absence or presence of solvent, with high regioselectivity, without activation of the diacid. The reactions can be performed using binary, ternary, and quaternary mixtures of 1) diacids with diols, 2) diacids with polyols, 3) polyols, diols and diacids, 4) diols and/or polyols, hydroxyacids and diacids, 5) lactones/carbonates with the components described in 1, 2, 3, or 4 above, 6) anhydrides that replace some portion of the diacid components in 1, 2, 3, 4 or 5, above, and/or 7) amino alcohols that replace some portion of the diol components in 1, 3, 5, and 6 above.

By using various mixtures of sugars with other building blocks, the sugars are partially or completely solubilized resulting in highly reactive condensation polymerizations. By this method, organic solvents and activated acids are not needed. However, low levels of organic solvents not exceeding two times the total weight of the monomers can be used to reduce the viscosity of polymerizations when weight average molecular weights exceeding 20 000 are desired.

The polymerization reactions give high molecular weight products ($M_w$ up to 200 000) with narrow polydispersities (as low as 1.1). Furthermore, using the method described herein the condensation reactions with carbohydrate building blocks proceed with high regioselectivity. Thus, of the $\geq 3$ hydroxyl groups of the polyols used, only two of these hydroxyl groups are highly reactive in the polymerization. These polymerizations are highly versatile allowing the simultaneous polymerization of lactones, hydroxyacids, cyclic carbonates, cyclic anhydrides, and amino alcohols. The method developed offers simplicity, mild reaction conditions, and the ability to incorporate carbohydrates, such as sugars, into polyesters without protection-deprotection steps. The polymerizations disclosed herein may be carried out at temperatures between 50 and 110° C. More preferably, the polymerizations are conducted between 60 and 95° C.

The disclosed process also results in the making of novel compositions of matter. Some example compositions are made by the polymerization of glycolide or glycolic acid that becomes incorporated into the condensation polyesters. Glycolic ester repeat units are incorporated into the polyesters to produce products that are intended to breakdown or degrade more rapidly by hydrolysis. Also, the incorporation of repeat units such as maleic acid that provide crosslinkable sites are part of this invention. These novel compositions are sugar-containing copolymers, many of which are semi-crystalline thermoplastics. The new sugar-containing polyesters were formed without using organometallic or other undesirable catalysts in a one-pot process.

Further, modification of sorbitol or glycerol hydroxyl groups that remain unreacted at the end of the polycondensation also is disclosed as a part of this invention. Such modifications of free hydroxyl groups can be conducted within the reaction mixture using acids such as but not to limited fatty acids, acrylic acid, and α-methoxy-ω-carboxyl-PEG.

DETAILED DESCRIPTION OF THE PREFERRED EMBODIMENTS

Introduction

Figure 1:
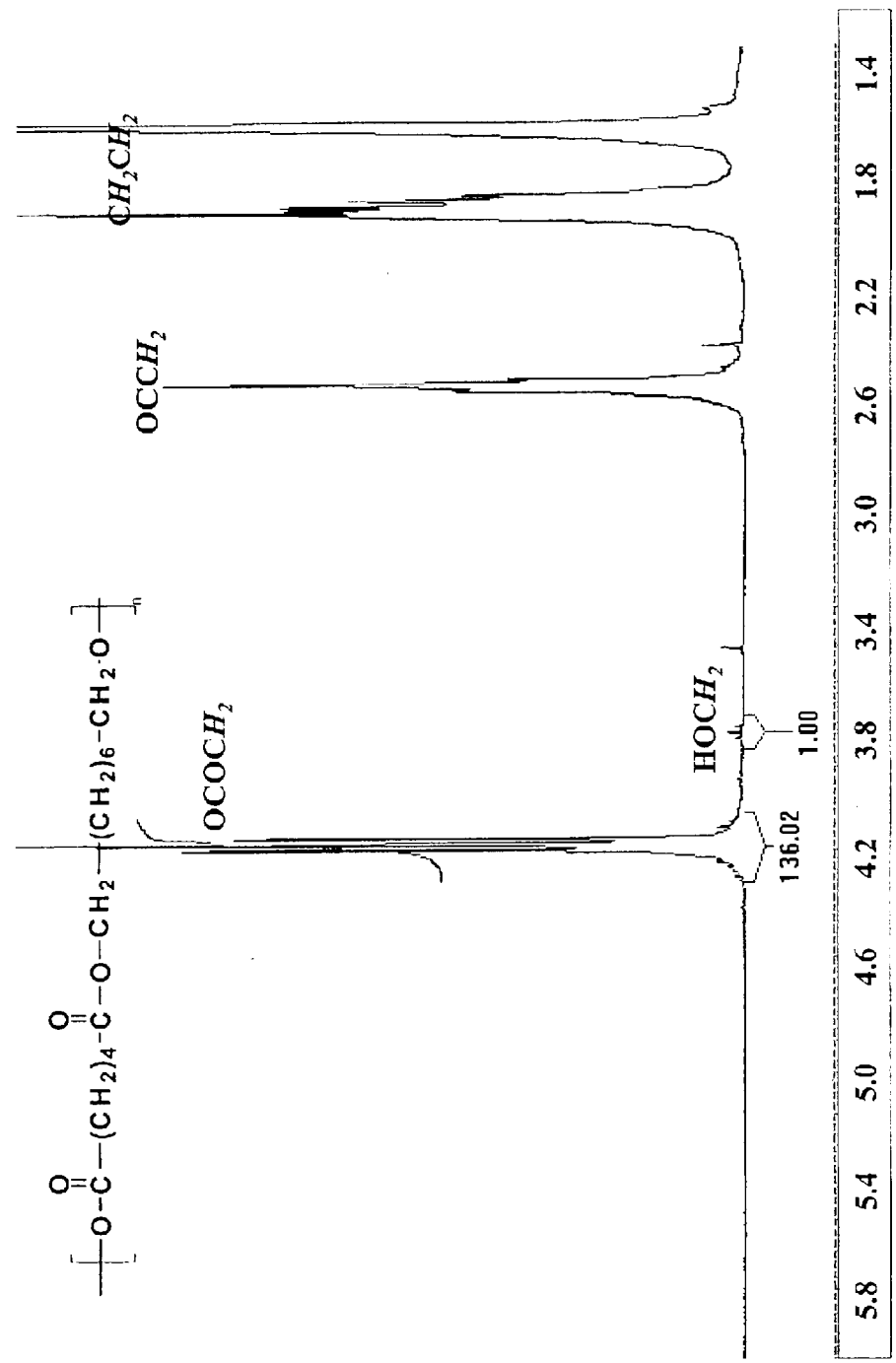
FIG. 1 is the $^1$HNMR spectra of poly 1,8 octamethylene adipate in CDCl$_3$.

The present invention overcomes previous limitations in condensation polymerizations. Previously, lipase and protease catalysis could be used to avoid protection-deprotection steps when polymerizing polyols. However, the methods used relied on performing reactions in organic solvents, using carboxylic acids that were activated with electron withdrawing groups, and using extraordinary high levels of catalyst (>30% by weight of the reactants). Alternative chemical polyesterification methods relied on costly protection-deprotection steps to obtain highly linear products. Chemical catalyzed polyesterification of polyols without protection-deprotection steps results in products that are crosslinked or seriously limited in molecular weight or the extent of polyol incorporation. The current process overcomes these difficulties, which have seriously limited the cost and chemical/physical properties that are attainable by polyol polyesters.

This invention is a new method that does not require protection-deprotection steps, can be carried out without solvent (bulk reactions), can be used as the only hydroxyl component in the reaction or mixed with other polyols or diols, and results in products that remain highly linear (little or no crosslinking) and have high molecular weights (up to 200 000 weight average). The novel process disclosed herein is based primarily on solventless enzymatic condensation polymerization of binary and ternary mixtures. The reaction components chosen partially or completely solubilize polar carbohydrate components that would otherwise be high melting and/or insoluble in the reaction mixture. This process avoids the use of polar aprotic solvents such as DMSO or DMF to dissolve the carbohydrates. Such polar aprotic solvents such as DMSO or DMF normally cause a large decrease in the activity of the enzymatic catalysts.

The present process also results in efficient synthetic routes to a wide range of new carbohydrate-polyesters. The regioselectivity of the selected enzymes, such as lipases, allows the direct incorporation of carbohydrates such as sugars into polyesters during condensation polymerizations without the use of solvents or groups that activate the carboxylate groups. New products with various contents of sugar repeat units that are nearly linear, have high molecular weights, are thermoplastic, and in many cases are semi-crystalline are produced. The free hydroxy groups along chains provide opportunities to develop specific hydrogen bonding interactions in blends, sites for further modification with: i) bioactive groups; ii) hydrophobes such as fatty acids; iii) hydrophilic groups such as PEG; and iv) groups that can be used for crosslinking (e.g. maleic anhydride, acrylic acid, stillbene, or other moieties that are reactive by thermal, photolytic, oxidative or electrolytic stimuli). This process includes unique ways to incorporate rapidly hydrolyzing groups such as glycolic acids into polyol-polyesters. Furthermore, the content of polyol in the product is highly variable. Thus, this invention provides methods that allow the control of the hydrolytic degradation of the new products. Furthermore, the new products of this invention can be biodegradable and can be constructed wholly or partially from renewable resources. In addition, since the polymerization is conducted under mild conditions, chemically sensitive building blocks such as those that contain silicone, phosphate, and C=C bonds can be used along with the carbohydrate building blocks to form a wide range of unique important polymer structures.

The new products that can be produced using the present process can have a myriad of uses and applications. The following list serves as an illustrative list of exemplary uses for products from this invention and should not be taken as complete. Food and non-food uses as surfactants and emulsifiers. Pharmaceuticals, for example for the delivery of bioactive agents. Scaffolds for the growth of cells. Bioresorbable medical materials. Biocompatible implant materials for devices like bone screws and plates. Component in artificial skin. Film-forming polymers for cosmetic applications. Density gradients for cell separation and diagnostics. Polyurethanes after reactions with isocyanate crosslinkers. Rigid foam boardstock. Non-foam polyurethane markets, such as for elastomers, coatings, sealants and adhesives. Polyurethane resins for hot melt adhesives. Components in coatings for vinyl flooring, sealants/adhesives, cast elastomers, and fibers. Water soluble polymers for water treatment.

It is understood that the polymers of the present invention will have application to uses such tissue engineering (e.g. a component in artificial skin or scaffolds for the growth of cells), food and non-food industries (e.g. surfactant and emulsifiers), pharmaceuticals (e.g. delivery of bioactive agents), bioresorbable medical materials, biocompatible implant materials for devices like bone screws and plates, cosmetics (e.g. film-forming polymers), density gradients (e.g. cell separation and diagnostics), plastics (e.g. as polyurethanes after reactions with isocyanate cross-linkers), foams, polyurethane alternative (e.g. rigid foam board stock), polyurethane alternatives and compliments (e.g. elastomers, coatings, sealants, or adhesives), polyurethane resins for hot melt adhesives, coatings for vinyl flooring, sealants/adhesives, cast elastomers, and fibers.

Definitions

In this specification, various terms are defined as follows:

"Regioselective reactions" are reactions in which at least two constitutional isomers can be formed from a single reactant but one isomer is observed to predominate the product of the reaction. Regioselective reactions also can include reactions in which one isomer is formed exclusively. In this invention it refers primarily to the selective polymerization of two hydroxyl groups contained within a polyol that has $\geq 3$ hydroxyl groups.

"Chemical reactions" can include the formation or dissociation of ionic, covalent, or noncovalent structures through known means. Chemical reactions can include changes in environmental conditions such as pH, ionic strength, and temperature.

"Bonds," "bonding," and "linkages" are ionic, covalent, or noncovalent of all types.

A "polymer" can be and can include homopolymers, copolymers, and combinations thereof.

A "polyol" can be any compound in which there are more than two hydroxyl groups. Polyol compounds can include compounds such as carbohydrates.

A "multiol" can be any diol or polyol.

A "polyester" can be any compound in which there is more than one ester bond.

Unless otherwise defined, all technical and scientific terms used herein have the same meaning as commonly understood by one of ordinary skill in the art to which this invention pertains. Although methods and materials similar or equivalent to those described herein can be used in the practice and testing of the present invention, suitable methods and materials are described below. In addition, the materials, methods, and examples are illustrative only and not intended to be limiting.

General Process Methods

1. General Protocol for Enzymatic Condensation Polymerization.

The reactions were performed in bulk (solventless) conditions by the direct reaction between diols and diacids, and optionally additional compounds selected from the group consisting of polyols, hydroxy acids, lactones, carbonates, anhydrides, and combinations thereof. The mixture of selected compounds is reacted in the presence of hydrolytic enzymes under bulk flow condition to prepare polymers with ester links. The reaction proceeds as a simultaneous polymerization and can provide a route for direct reactions between selected compounds. The simultaneous polymerization imparts unique characteristics on the resultant polymer, including high molecular weight, high regioselectivity, and a lower level of polydispersity.

Lipase was selected as the representative family of enzymes as it is in common use and readily extrapolated to many different reactions. The lipase (0.001 to 1% wt/wt of the monomers) was dried in a vacuum desiccator (0.1 mmHg, 25° C., 24 hr) and was transferred into a 50 mL round-bottom flask containing a homogeneous melt of a polyol/diol/diacid mixture. The ratio of carboxylic acid to reactive hydroxy groups was adjusted so that they were equimolar (1:1). This was accomplished by considering only the primary hydroxyl groups of the polyols as reactive. The flasks were stoppered with rubber septa. The flasks then were placed into a constant temperature oil bath (50–100° C.) at 220 rpm. After 1–2 hr, the reaction mixtures were subjected to reduced pressure (from 0.1 to 100 mmHg) to control the rate of water removal from the system.

To monitor the progress of the reactions with time, 2% of the total reaction mixture was withdrawn from the round bottom flask with a spatula as samples. These samples were placed into an organic solvent. The insoluble enzyme was filtered through Gelman acrodisc 13CR PTFE 0.45 $\mu$m filter. After removal of the solvent, NMR spectra and GPC chromatographs were used to analyze these products. Molecular weight build-up was monitored as a function of time (1 to 48 hr) by using GPC. After 18 to 48 hr, the reactions were terminated by dissolving the product in an excess of solvent, removing the enzyme by filtration, and removing the solvent in vacuo. The enzyme recovered from these operations was analyzed to determine its residual activity (disclosed in more detail below) and preferably re-used. In some examples the product was fractionated by precipitation into a non-solvent (e.g. methanol). The precipitates were isolated by filtration and then dried in a vacuum oven (0.1 mmHg, 50° C., 24 hr). The yield, average molecular weights ($M_n$ and $M_w$), and polydispersity index (PDI) of the samples were determined. NMR spectroscopy was used to determine the regioselectivity of ester formation at the sugar units.

More specifically, as catalyzed polymerizations can include polycondensations, the ratio of carboxylic acid to reactive hydroxy groups can be adjusted to be closer to 1:1 (equimolar). Although the reaction can proceed with ratios lower and higher than 1:1, the 1:1 ratio has resulted in more optimal product. Further, the molar ratios of carboxylic acid and reactive hydroxy groups can be tuned to prepare a product with terminal acid groups or terminal hydroxy groups. In the case where the resulting polymer has terminal hydroxy groups, the length of the polymer may be varied by varying the excess of hydroxyl groups present in the initial reaction mixture. For example, increasing the amount of hydroxyl groups relative to the number of acid groups in the reaction mixture will give rise to polymers of shorter chain length. At high dilution certain hydroxy carboxylic acids tend to form lactones and it is therefore preferred that, when such hydroxy acids are used in the present process, they are used only in high concentration in order to avoid the unwanted lactonization reaction.

In alternative embodiments the polyesters produced by the present process may comprise or consist of repeating units of a diacid and a diol; a diacid and a polyol; a diacid, a diol and a polyol; a diacid, a diol and a hydroxy acid; a diacid, a polyol and a hydroxy acid; a diacid, a diol, a polyol and a hydroxy acid; a diacid, a dimethyl ester, a diol, and a hydroxylamine; a diacid, a diol, a hydroxylamine, and an anhydride; a diacid, a diol, a polyol, a hydroxylamine, and an anhydride; or any other suitable combination of monomers, for example combinations in which the diacid is replaced by its methylester or ethyl ester derivative. Preferred illustrative combinations include adipic acid/1,6-hexane diol/glycerol, adipic acid/1,6-hexane diol/sorbitol, adipic acid/1,4-butanediol/dimethyladipate/ethanolamine, adipic acid/1,4-butanediol/succinic anhydride/ethanolamine, dimethyladipate/1,4-butanediol, adipic acid/ethanolamine, ethanolamine/adipic acid, diethanolamine/adipic acid, ethanolamine/dimethyladipate, N-methylethanolamine/dimethyladipate, diethanolamine/dimethyl adipate, adipic acid/glycerol, adipic acid/sorbitol, adipic acid/sucrose, adipic acid/1,4-butanediol/sorbitol, adipic acid/diethylene glycol, adipic acid/diethylene glycol/glycerol, adipic acid/diethylene glycol/sorbitol, adipic acid/diethylene glycol/trimethylolpropane, diethylene glycol/adipic acid/dimethylolpropane, adipic acid/1,6-hexanediol. Other preferred illustrative combinations can use sucrose or another carbohydrate (such as, for example purposes only, xylitol, or lactose) in place of glycerol or sorbitol; diacids of longer chain length (such as, for example purposes only, linear α-,ω-diacids with 8 to 32 carbons) in place of adipic acid; diols of longer chain length (such as, for example purposes only, linear α-,ω-diols with 8 to 32 carbons) in place of 1,4-butane diol; anhydrides other than succinic anhydride such as itaconic anhydride, maleic anhydride, glutaric anhydride; alcohol amines of differing chain length other than ethanolamine (such as, for example purposes only, butanolamine, orhexanolamine); and diamines such as 1,4-diaminobutane in place of alcohol amines such as 1,4-butanolamine.

The enzyme used in the present process may be used in free form or may be bound on an inert carrier, for instance a polymer such as an anion exchange resin, cation exchange resin, an acrylic resin, polypropylene resin, polyethylene resin, polyester resin, silica resin, or polyurethane resin. When the enzyme is bound on an inert carrier it can easily be removed from the reaction mixture (e.g. by filtration) without the need for complicated purification steps. Preferably the enzyme is recovered from the reaction mixture and re-used. Preferably the enzyme is present in isolated form. Enzymes bound to an inert carrier may to some extent desorb or become detached from the carrier and diffuse into the reaction mixture.

The enzyme may be present in the reaction vessel until the reaction reaches completion. Alternatively, the enzyme may be removed from the reaction vessel after the initial oligomerization step of the reaction has reached completion. In the case where hydroxyl groups are present in excess, the initial step is complete when all the carboxylic acid bearing monomers have reacted to form an ester adduct. The enzyme may be removed after completion of the first step of the reaction for example by filtration. The further step of converting the resulting oligomers into polyesters is carried out with removal of water, or other condensation products (e.g. methanol or ethanol when methyl or ethyl esters of carboxylic acids are used as monomers), which then drives the reaction to form products. The content of water within reactions is a parameter for optimizing a given enzyme-catalyzed condensation process.

Removal of the enzyme after the initial oligomerization step is advantageous in the case that the oligomer formed will be used directly or converted by a chemical process (e.g. reaction with diisocyanates) to higher molecular weight products. The recovered enzyme from such reactions can be recycled and reused.

As the reaction proceeds, the viscosity of the reactants increases and increased shearing forces will be needed to stir the reaction mixture. In addition, the conversion of oligomers to polyester may be accelerated by raising the reaction temperature to at least 80° C., for example at least 85° C., 90° C., 95° C. or 100° C. An alternative solution to increased temperature and increased shear is the introduction of small amounts of solvent to the reaction. A small amount of solvent would constitute 0.1 to 2 parts of solvent for every one part of reaction contents.

The amount of enzyme used is not critical but the enzyme should be present in a quantity ample to catalyze the polymerization. Too little enzyme can result in longer reaction times whereas too much enzyme may be unnecessary but may result in faster reaction times. With the lipase from *Candida antarctica* (Novo Industries AS Catalog no. SP 435) it has been found convenient to use from 0.1 to 1.5% by weight of supported enzyme based on the total weight of monomers, preferably 0.1 to 0.6% and most preferably 0.15 to 0.3% of supported catalyst. One of ordinary skill in the art can determine the appropriate amount of enzyme without undue experimentation.

This method can be carried out at temperatures ranging from 10 to 120° C. Preferably, the method is carried out at a temperature between 50° C. and 100° C. Most preferably, the method is carried out at temperature between 65° C. and 90° C. It should be noted that some enzymes can denature at temperatures significantly higher than 90° C. and that some enzymes may only allow the reactions to proceed relatively slowly at temperatures below 10° C.

The method can proceed at atmospheric pressure or less than atmospheric pressure. The rate of water removal will affect the reaction rate. It is understood by those skilled in the art that for every polymerization there will be an optimal water content in the reaction. The water may be removed by applying reduced pressure to various extents at various times during the reaction. Alternatively, the water may be removed by flushing the reaction with dry air. To maintain an optimal water content, it may be necessary to alternate between dry and wet air flushes. Alternatively, the water may be removed with a wiped film evaporator under reduced pressure, for instance, 5 mmHg or even 1 mmHg or less. In another alternative method, a desiccant such as a molecular sieve can be used, taking precautions to avoid physical damage to supported enzymes due to abrasion between the desiccant and the enzyme support.

Thus, at various times in the condensation polymerization the progression of the reaction can be enhanced by adding water to or removing water from the reaction flask. Methods to monitor and control water contents in reactions for lipase-catalyzed esterifications for low molar mass compounds are well known to those skilled in the art.

Generally, the process is carried out in the presence of enough water to hydrate the enzyme and substantial quantities of water may be present without affecting the polyesterification. However, removal of most of the water (i.e.

apart from that required to hydrate the enzyme) will be required at least at the end of the reaction if high molecular weight polyester products are desired.

The reaction in the present method can be quenched by means understood by a person of ordinary skill in the art. For example, the quenching of the reaction can be accomplished by dissolving the product in an excess of solvent, removal of the enzyme by filtration, and removal of the solvent in vacuum. Alternatively, the enzyme can be left within the reaction product. In the presence of little or no water or another alternative nucleophile, the product will remain stable. Also, the enzyme can be deactivated with heat, such as that used during the thermal processing of the product into a shaped article. Alternatively, to facilitate removal and re-use of the enzyme, it can be immobilized within the reactor (e.g. reactor walls, baffles, impellers). Alternatively, the enzyme may be removed from the product by filtration when the product containing the enzyme is heated above its melting point allowing it to flow. In the case of polymers that have a high melt viscosity, low levels of a solvent can be added to the polymer melt to facilitate the filtration.

In the event that methanol or ethanol is produced by the reaction in which monomers bearing carboxylic acid ester groups are used, such alcohols must not be permitted to accumulate in the reaction mixture. Removal of a volatile alcohol can be accomplished by flushes with air or by placing the reaction under reduced pressure.

The total reaction time is generally from 2 to 48 hr, preferably from 12 to 24 hr. The reaction can be monitored by removing and testing samples.

The present invention generally enables the production of high weight average molecular weight polyol-containing polymers. For some applications of the present invention, such as where chain entanglements are needed to increase the strength of solid-state materials, or when liquid solutions of the polymer product are needed that have high viscosity, high molecular weight polymeric products are preferred. In such cases it is preferred that the weight average molecular weight of the resultant polymer is greater than 5 kDA. More preferably, the resultant polymer is greater than 15 kDA. Most preferably, the resultant polymer is greater than 30 kDA. One can measure the average molecule weight of the polymer using means obvious to those with ordinary skill in the art, for example, gel permeation chromatography.

The polyol-containing polyesters produced by the present invention generally can comprise from 6 to 50 monomer units, preferably from 10 to 40 monomer units and most preferably from 30 to 40 monomer units. The end group composition can be varied by methods that are known by those skilled in the art.

The polyester-containing polymers prepared using the present invention can have relatively narrow polydispersity as calculated by conventional means. Preferably the polydispersity of the polyol-containing polymer is less than 2.0. More preferably, the polydispersity is less than 1.5. In one embodiment of the present invention a polyester can have a polydispersity of 1.5 or less, for example, polymers comprising sugar residues.

The polyesters produced by conventional processes generally contain at least 0.5% or more, for instance up to 1.5% or more, by weight of cyclic diester impurities such as the cyclic ester 1,6-dioxacyclododecane-7,12-dione. When necessary, the cyclic diester impurity content is reduced by methods such as wiped film evaporation or high vacuum distillation. After distillation, contents of from as low as 0.3 to 0.7% by weight of the cyclic diester impurities can be achieved. This level of impurity is often acceptable but is achieved at great expense. The presence of cyclic diester impurities is detected using gas chromatography mass spectrometry or high performance liquid chromatography (HPLC).

According to another embodiment of the present invention the polyesters having hydroxy terminal groups or hydroxyl groups along the chain are further reacted with molecules containing 2 or more isocyanate groups to produce polyurethanes. Generally the enzyme is removed from the polyester before the reaction with isocyanate. This prevents the enzyme and its support from interfering with the polyester/isocyanate reaction. Generally water produced during the polyesterification is removed before reaction with isocyanate.

The polyesters of the invention have sharp melting points (unlike previously produced materials with wide dispersity) and impart to the polyurethanes excellent physical properties such as desirable combinations of hardness and flexural and tensile strength. In addition, the polyesters of this invention are biodegradable and contain variable contents of hydroxyl groups along the main chain. The biodegradability of the products can be useful in the manufacture of biodegradable plastics for environmental disposal as well as for medical applications where bioresorption of the biomaterial is desired.

Certain polyesters produced in accordance with the present invention are novel materials and form further aspects of the invention. For example, in a further aspect of the invention there is provided a polyester comprising as repeating units the residues of at least one of oxalic acid, lactic acid and glycolic acid. Alternatively, in a further aspect of the invention there is provided polymer compositions that contain both ester and carbonate linkages. For the latter, copolymerizations are performed by simultaneous condensation of diacids/diols and ring-opening of trimethylene carbonate. Preferences expressed above in relation to the compositions of the polyesters and poly(ester-co-carbonates) apply to these aspects of the invention as well. The polyesters and polyurethanes of the present invention find uses as shaped articles and foams, such as, for example, for motor vehicles.

The resultant polyol-containing polymers of the present invention can be linear or branched. Branched polymers and linear polymers can have pendant hydroxyl groups and can be formed by introducing a small percentage of a branched polyfunctional monomer such as trimethylopropane (TMP), dimethylopropanoic acid (DMPA), or pentaerythritol (PE). Branching can also occur during polymerizations with polyols due to regioselectivity that is <100%. Thus, incorporation of such monomers gives rise to both linear and branched polyesters. The resulting linear polyesters generally have pendant hydroxyl groups that lead to branching/cross linking if the polyester is converted into a polyurethane by reacting with diisocyanates.

2. Experimental Methodology for Bench-Scale Processes.

Bench-scale process studies experiments were done in a stirred tank batch reactor. The reactor had the following specifications: Total volume, 5 L; working volume, ≈1 L; water removal under reduced pressure, ≈50 mmHg; amount of catalyst, 1% (w/w); temperature sensing and control, platinum resistance RTD connected to PID controller, 4–80° C.; and agitation, single shaft, six-blade turbine impeller, 50–1200 rpm with permanent magnetic DC motor based on a PID controller.

In experiments with diol and diacid, 1,6-hexane diol was first added to the reactor and allowed to melt (m.p. 44° C.), after which agitation was started and maintained at the required level. Adipic acid (as powder) was slowly added to the reactor to maintain a uniform heterogeneous suspension. The process parameters were allowed to stabilize and then the enzyme was added. The reactor was sealed tightly and vacuum was applied. The exhaust was provided with a dry ice trap to collect the water removed from the reactor. In experiments with sugars, the same protocol was followed except that the sugars were added before adipic acid.

Samples were drawn from the reactor by rapid suction using a syringe attached to a silicone tube. GPC analysis of the samples was done in chloroform at a concentration of 2 mg/ml. Viscosity of the samples (at their respective reaction temperatures) were determined using a Brookfield spindle type viscometer. Enzyme particles in the samples were separated by dissolution in chloroform followed by filtration. Retained enzyme activity was determined by GC using the propyl laurate method.

3. Assay Protocol for Lipase in Organic Media.

The lipase activity in organic media was determined by using the propyl laurate method (the esterification of lauric acid with propanol catalyzed by lipase to give propyl laurate was monitored). The amount of propyl laurate formed after a specific period of time was determined and used to calculate the recovered catalyst activity. Molecular sieves functioned to remove the water formed. The assay was carried out at 70° C., in toluene (1 ml), for 3 hr at 200 rpm. To the reaction mixture lauric acid (200 mg), propanol (75 $\mu$l), and recovered catalyst (20 mg) were added. After 3 hr the reaction was terminated by filtering off the enzyme. The filtrate was assayed for propyl laurate by GC using the following conditions: column, DB 5 (30 m×0.32 mm×1 $\mu$m); detector, flame ionization (FID); carrier gas, helium at a flow rate of 15 ml/min; temperature program, 45° C. (hold 1 min) to 100° C. at 7° C./min (hold 10 min) to 280° C. at 10° C./min (hold 4 min); injector temperature, 350° C.; and detector temperature, 350° C. From the GC data, the recovered enzyme activity was calculated as:

$$\text{Residual activity} = \frac{\text{Peak area (propyl laurate) of the recovered catalyst}}{\text{Peak area (propyl laurate) of the unused catalyst}} \times 100$$

General Analytical Techniques

1. Nuclear Magnetic Resonance (NMR).

Proton ($^1$H) and carbon ($^{13}$C) NMR spectra were recorded on a Bruker Instruments, Inc. DPX300 spectrometer at 300 and 75.13 MHz, respectively. The chemical shifts in parts per million (ppm) for $^1$H- and $^{13}$C-NMR spectra were referenced relative to tetramethylsilane (TMS) as an internal reference at 0.00. High-resolution $^1$H- and $^{13}$C- 1 and 2-dimensional FT-NMR, Heteronuclear $^1$H-$^{13}$C correlations, experiments were performed. One and 2-D NMR spectra were used to determine the regioselectivity of the enzymatic polyesterification reactions.

2. Molecular Weight Measurements.

Molecular weights were determined by gel permeation chromatography (GPC) using a Waters HPLC system equipped with a model 510 pump, Waters model 717 autosampler, model 410 refractive index detector, and model T-50/T-60 detector of Viscotek Corporation with 500, $10^3$, $10^4$ and $10^5$ Å ultrastyragel columns in series. Trisec GPC software version 3 was used for calculations. Chloroform was used as the eluent at a flow rate of 1.0 mL/min. Sample concentrations of 0.2% wt/vol and injection volumes of 100 $\mu$L were used. Molecular weights were determined based on conventional calibration curve generated by narrow molecular weight polystyrene standards obtained from Aldrich Chemical Company. For some of the polymer products their molecular weight was analyzed by absolute light scattering methods. Light scattering studies were also used to determine hydrodynamic constants such as the radius of gyration. These studies were performed by using ultraviolet-visible photometer, interferometric refractometer (a Wyatt OptiLab DSP), and multi-angle laser light scattering photometer (a Wyatt Dawn DSP light Scattering Instrument).

Thermal Properties, Mechanical Properties and Crystallinity

The solid-state thermal properties, mechanical properties and crystalline structures of the polyol-containing polyesters were studied.

1. Thermogravimetric Analysis (TGA).

Thermalgravimetric analysis (TGA) measurements were performed with a TA Instruments TGA2950 Thermogravimetric Analyzer at a heating rate of 20° C./minute in a nitrogen atmosphere. Extrapolated onset decomposition temperatures were taken to study the thermal stabilities of these polymers.

2. Differential Scanning Calorimetry (DSC).

A TA Instruments DSC 2920 Differential Scanning Calorimeter was used for calorimetric analysis that were carried out with between 4 and 13 mg of sample, a heating rate of 20° C./min and a nitrogen purge. Values for the peak melting temperature ($T_m$) and melting enthalpy ($\Delta H_{mf}$) were recorded during the first heating scan.

3. Wide Angle X-Ray.

Wide Angle X-ray scattering (WAXS) were performed with a Philips X-ray Diffractometer with Cu K$_\alpha$ radiation ($\lambda$=1.5418 Å, 40 KV, 20 mA Å). A scanning speed of 0.008°/min with a sample interval of 0.01° was used. Degrees of crystallinity ($\chi_c$) were calculated from diffracted intensity data by dividing the area of crystalline peaks by the total area of the crystalline peaks and the amorphous scattering. (For selected samples, isothermal crystallization measurements were determined using the DSC.)

4. Dynamic Mechanical Analysis (DMA).

Dynamic mechanical measurements were carried out on compression-molded bars (35.4 mm×12.7 mm×1.9 mm) with a TA Instruments DMA 2980 Dynamic Mechanical Analyzer in the single-cantilever mode (heating rate=3° C./minute, frequency=3 Hz). DMA was used to measure the modulus (stiffness) and damping (energy dissipation) properties of materials as they are deformed under periodic stress. Such measurements provided quantitative and qualitative information about the performance of the new polymers that were synthesized. DMA is particularly useful for evaluating polymeric materials, which exhibit time, frequency, and temperature effects on their mechanical properties because of their viscoelastic nature. The $\alpha$ relaxation peaks of the loss modulus-temperature spectra of these polymers were taken as the glass transition temperatures.

5. Diacids.

Scheme 1: HOOC—R—COOH

Where: R=$(CH_2)_n CH_x(R_1)(R_2)(CH_2)_m$ $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phospates, pphosphoesters, and general members of the silicone family, and where $R_1$ may be along the chain, a pendant group that is attached directly to carbon that is along the chain, attached indirectly to the main chain through a spacer group, $R_2$=hydrogen, keto, nitrile, halogen, thiol, disubstituted amines, trisubstituted amines, tetrasubstituted amines, carboxylic acid, hydroxyl group, acetal, ether, alkene,alkyne, isonitrile, nitrates, sulfates, phosphates, phosphoesters, and general members of the silicone family, n=0–32, m=0–32, and x=0–2;

R=CH=CH, $CH_2CH$=$CHCH_2$; and

R=$(CH_2)_x$(—Si[R']$_2$—O—)$_n$$(CH_2)_x$

X=1–10, n=1 to 1000, and

R'=methyl, phenyl, ethyl, propyl, butyl or any mixture of these groups.

Aliphatic dicarboxylic acids relevant to the present invention include R=$(CH_2)_n$ where n=0 to 30. The $R_1$-groups may be side or pendant groups or along the main chain. $R_1$-groups include carbon double or triple bonds, ketones, esters, nitriles, isonitriles, nitrates, sulfates, phosphates, phosphoesters, halogens, thiols, disubstituted amines, trisubstituted amines, tetrasubstituted amines, carboxylic acid, hydroxyl group, acetal, ether, members of the family of silicone compounds (e.g. {—Si[R]$_2$—O—}$_n$). Examples of diacids used in this invention include, but are not limited to, oxalic acid, succinic acid, glutaric acid, adipic acid, azealic acid, sebacic acid, fumaric acid, and maleic acid. In the most preferred case adipic acid is used.

6. Anhydrides and Hydroxyacids.

Anhydrides and hydroxyl acids can be partially or fully solubilized within bulk reactions that include carbohydrate monomers. Under such conditions, without activation of the acid groups, polymerizations proceed rapidly to give high molecular weight products. Suitable aliphatic anhydrides include but are not limited to succinic anhydride, maleic anhydride, itaconic anhydride, and phthalic anhydride. Suitable hydroxy acids include those containing from two to twenty two carbons. Preferably they contain ω-hydroxyl groups but they may also contain secondary hydroxyl groups. Suitable aliphatic hydroxyl acids include but are not limited to glycolic acid, lactic acid, 4-hydroxybutyric acid, 6-hydroxycaproic acid, 8-hydroxyoctanoic acid, 10-hydroxydecanoic acid, 12-hydroxydodecanoic acid, 16-hydroxyhexadecanoic acid, 12-hydroxy stearic acids, 12-hydroxy oleic acid, 17-hydroxyloleic acid, and cholic acid. Other suitable hydroxyl acid building blocks include those commonly described as $AB_x$ (x=2–7) where A and B are carboxyl and hydroxyl groups, respectively. Alternatively, $AB_x$ building blocks also include those where A and B are hydroxyl and carboxyl groups, respectively. Suitable $AB_2$ building blocks include but are not limited citric acid, maleic acid, bis-2,2 hydroxy methylpropanoic acid, malonic acid, and most preferably maleic acid.

7. Diols.

Scheme 2: $HOH_2C$—R—$CH_2OH$

Where: R=$(CH_2)_nCH_x(R_1)(R_2)(CH_2)_m$ $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phospates, pphosphoesters, and general members of the silicone family, and where $R_1$ may be along the chain, a pendant group that is attached directly to carbon that is along the chain, attached indirectly to the main chain through a spacer group, $R_2$=hydrogen, keto, nitrile, halogen, thiol, disubstituted amines, trisubstituted amines, tetrasubstituted amines, carboxylic acid, hydroxyl group, acetal, ether, alkene,alkyne, isonitrile, nitrates, sulfates, phosphates, phosphoesters, and general members of the silicone family, n=0–32, m=0–32, and x=0–2;

R=CH=CH, $CH_2CH$=$CHCH_2$;

R=C≡C, $CH_2CH$≡$CHCH_2$; and

R=$HO(CH_2)_x$(—Si[R']$_2$—O—)$_n$$(CH_2)_xOH$

X=1–0, n=1 to 1000, and

R'=methyl, phenyl, ethyl, propyl, butyl or any mixture of these groups.

Suitable diols for the present invention include but are not limited to α,ω-diols that contain from C-2 to C-22 carbon atoms (see Scheme 2). Diols may also include as side groups or along the chain carbon-carbon double or triple bonds, ketones, esters, nitriles, isonitriles, nitrates, sulfates, phosphoesters, halogens, thiols, disubstituted amines, trisubstituted amines, tetrasubstituted amines, carboxylic acid, acetal, ether, and members of the family of silicone compounds (e.g. {—Si[R]$_2$—O—}$_n$). Examples of suitable diols are ethylene glycol, poly(ethylene glycol) (e.g. molecular weight 200 Da, 1,3-propane diol, 1,4-butanediol, 1,5-pentanediol, 1,6-hexanediol, 1,8-octanediol, and 1,12-dodacanediol. The most preferable examples in these inventions are 1,4-butanediol, 1,6-hexanediol, and 1,8-octanediol.

8. Polyols.

The polyols in the present invention will have at least three hydroxyl groups of which at least two must be primary or highly reactive secondary hydroxyl groups. Suitable polyols includes glycerol, erythritol, pentaerythritol, xylitol, ribitol, sorbitol, 1,2,6 hexane triol, 1,2,4-butanetriol, maltose, sucrose, and lactose. With the exception of 1,2,6 hexane triol and 1,2,4-butanetriol the polyols in the previous sentence fall within the large family of carbohydrates. Sorbitol is the preferred polyol in this invention.

Numerous polyol monomers in pure form or as mixtures with other polyols can be used with the present method. Such monomers, as used herein, can be generally represented by the formula $R_p(OH)_n$ where $R_p$ is the backbone of the polyol monomer and n is the number of hydroxyl groups on the polyol monomer. Preferably, $R_p$ is selected so that polyol monomers have at least two lipase active hydroxyl groups that are primary or secondary hydroxyl groups, and either secondary or tertiary hydroxyl groups that are not reactive or react very slowly relative to the lipase active hydroxyl groups. Preferably the lipase active hydroxyl groups will react at least five times more rapidly than the non-active or slowly reactive secondary/tertiary hydroxyl groups. More preferably, the lipase active hydroxyl groups will react at least ten times more rapidly than the non-active or slowly reactive secondary/tertiary hydroxyl groups.

The $R_p$-group is flexible and can be selected from an array of structures. The $R_p$-group can be a carbon-based structure with between 1 to 10 carbons. The $R_p$-group can be selected from the group comprising alkanes, alkenes, alkynes. The $R_p$-group can also have multiple hydroxyl groups, be cyclic, branched, and non-branched. Furthermore, the $R_p$-group can have ketones, esters, nitriles, isonitriles, nitrates, sulfates, phosphoesters, halogens, thiols, disubstituted amines, trisubstituted amines, tetrasubstituted amines, carboxylic acids, acetals, ethers, and members of the family of silicone compounds (e.g. {—Si[R]$_2$—O—}$_n$). The $R_p$-group can be substituted or unsubstituted.

It can be optimal to select carbohydrates as the polyol monomers for use with the present invention as 'carbo'- based polymers. Carbohydrate monomers are particularly appropriate materials for the formation of polyesters and chains with mixed linkages (e.g. ester/carbonate, ester/phosphoester, ester/silicone). Such polymers can be used in place of currently produced products from petroleum-based materials because such polymers (a) contain naturally occurring, relatively abundant renewable materials; (b) are polyfunctional with multiple reactive primary alcohols that can readily be derivatized; (c) are nonreducing carbohydrates and thus do not have the potential for the wide variety of side-reactions characteristic of reducing carbohydrates; (d) have relatively easily hydrolyzed glycosidic linkages that allow polymers made from such materials to be potentially more biodegradable than similar polymers made with hydrogenated carbohydrates, such as sugar alcohols; and (e) contain naturally occurring products in common use and therefore potentially useful in the formation of novel ingredients for the food, beverage, pharmaceutical, and chemical industries.

Exemplary sugar based polyols that are suitable for use with the present method include monosaccharides, oligosaccharides, poly(n-alkylglucosides) and cyclodextrins. As polyols can include sugars, examples of suitable sugars includes monosaccharides (such as, for example purposes only, glucose), oligosaccharides (such as, for example purposes only, sucrose, maltose, lactose, maltatrios) and derivatives of such carbohydrates (such as, for example purposes only, poly[n-alkylglucosides]). Preferably, the sugar selected is sorbital.

9. Lactones.

The lactones in the present invention include those with 4 to 16 membered rings. Suitable lactones include β- or δ-butyrolactone, γ-valerolactone, ε-caprolactone, 8-octanolide, ω-dodecanolide, ω-pentadecalactone, lactide, dioxanone and glycolide. The preferred lactone is glycolide.

10. Cyclic Carbonates.

The cyclic carbonates in the present invention include trimethylene carbonate, 1-methyltrimethylene carbonate, 1,3-dimethyltrimethylenecarbonate, 2,-2-dimethyltrimethylenecarbonate, 2-methyl-2-carboxytrimethylenecarbonate, 2-carboxytrimethylenecarbonate, 1,2-O-isopropylidene-[D]-xylofuranose-3,5-cyclic carbonate, and 1,2-isopropylidene glucofuranose-4,4-bishydroxymethyl cyclic carbonate. The preferred cyclic carbonate is trimethylene carbonate.

11. Enzymes.

Lipases, proteases and esterases are the preferred enzyme families that can be used in this invention as catalysts for the regioselective polycondensation of sugars/diols/diacids in-bulk without activation of the acid groups. Many enzymes are commercially available and are suitable choices for use in the polymerizations described herein. They include Novozyme-435 (physically immobilized *Candida antarctica* Lipase B), Lipase IM (*Mucor meihei*), PS-30 (*Pseudomonas cepacia*), PA (*Pseudomonas aeruginosa*, Lipase PF (*Pseudomonas fluorescence*), lipase from *Candida cylinderacea*, porcine pancreatic lipase and the lipase from *Aspergillus niger*. Proteases such as α-Chymotrypsin Type II from bovine pancreas, papain, pepsin from porcine stomach mucosa, Protease Type XIII from *Aspergillus* saitoi, Protease (Pronase E) Type XIV from *Streptomyces griseus*, Protease Type VIII (Subtilisin Carlsberg) from *Bacillus lichenifomis*, Protease Type X (Thermolysin) from *Bacillus thermoproteolyticus rokko*, and Protease Type XXVII (Nagarse).

Other lipases and improved forms of the above lipases that may be used in this invention can be obtained by commonly used recombinant genetic methods such as error-prone PCR and gene-shuffling. Furthermore, other suitable lipases may be obtained by the mining of DNA from various environments such as in soil. The preferred enzyme in the present invention is an immobilized form of the Lipase B from *Candida antarctica*. Lipase B from *Candida antarctica* also can be used by addition to the reaction mixture in non-immobilized form. An example of a commercially available immobilized form of Lipase B from *Candida Antarctica* is Novozyme-435 (available from Novozymes). Other macroporous resins that may be used for the immobilization of Lipase B from *Candida antarctica* include silica with various modifications, Accurrel (Akzo Nobel), purolite, QDE, Amberlite.

EXAMPLES

Example 1

Diacid and Diol Condensation

Scheme 3:

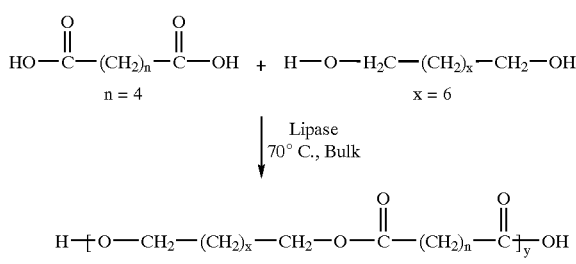

Materials: Adipic Acid, Octaneidol, Novozyme-435.

Adipic acid (Aldrich 11.4 g, 0.1 mole, 1 eq.) was suspended in the melt of octanediol (Aldrich, 11.4 g, 0.1 mole, 1 eq.) at 75° C. Novozyme-435 (220 mg) was charged to the flask and the reaction was continued for 30 min. The reaction was then subjected to reduced pressure (from 10 mmHg) to remove water from the system. For all other details, see the General Process Methods above. After a 24 hr reaction time, the reaction mixture was fractionated by precipitation into methanol. The resulting product was obtained in >96% yield with an $M_n$ of 22.6 kg/mol and $M_w/M_n$ of 1.7 (analyzed by light scattering). Analysis of aliquots (2-24 hr) from gel permeation chromatography was used to show the correlation between reaction time and molecular weight build-up. Proton NMR (FIG. 1, in $CDCl_3$) of the non-fractionated product after 24 hr was used to analyze the polymer end-group structure. The signals were observed at δ4.08 (O=COCH$_2$), 3.64 (CH$_2$OH), 2.34 (O=CCH$_2$), 1.66, 1.24 (all other methylenes). The chain length can be determined from the relative intensity of the signals at 4.08 vs. 3.64. The methylene next to free acid was not resolved and is often concealed within the methylene signal of its ester (2.34). Therefore, the product was derivatized with oxalyl chloride and the signal at 3.64 shifted to 4.21 and a new signal at 2.9 appeared. These signals are due to the methylene carbons next to the oxalyl chloride derivatized chain-end hydroxyl and carboxyl groups, respectively. The ratio of the two signals was used to determine the relative amount of hydroxyl to carboxyl chain-ends. This analysis showed that 60% of the chain-ends were hydroxyl groups. The above polyesters exhibited high thermal stability. The extrapolated onset decomposition temperature was 395° C. and the polymer completely decomposed at 450° C.

In a bench scale study hexanediol (4 moles, 473 g) was first added to the reactor and allowed to melt (m.p. 44° C.) followed by agitation at a maintained and required level. Adipic acid (4 moles, 585 g) was slowly suspended to the reactor and a uniform heterogeneous suspension was maintained. Effect of various parameters (i.e. temperature, agitation, enzyme activity) on molecular weights were studied. Generally, the influence of agitation on molecular weight is more pronounced at higher temperatures (90° C.) than at lower temperatures (70° C.). Further, the effect of temperature on $M_n$ is lesser at both high and low agitation— probably due to improper mixing at low agitation (200 and 300 rpm) and shear inactivation at high agitation (600 rpm). Enzyme activity decreases linearly with agitation at all temperatures. Temperatures above optimum (70° C.) do not affect shear stress at low (200 and 300 rpm) and high (600 rpm) agitation rates. Lastly, no significant effect of temperature on shear stress at lower agitation (200 and 300 rpm).

Example 2

Diacid and Polyol Condensation

Scheme 4:

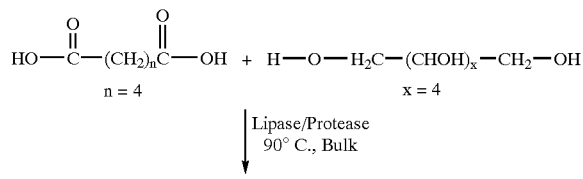

-continued

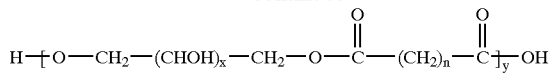

Materials: Adipic Acid, Sorbitol

Figure 2:
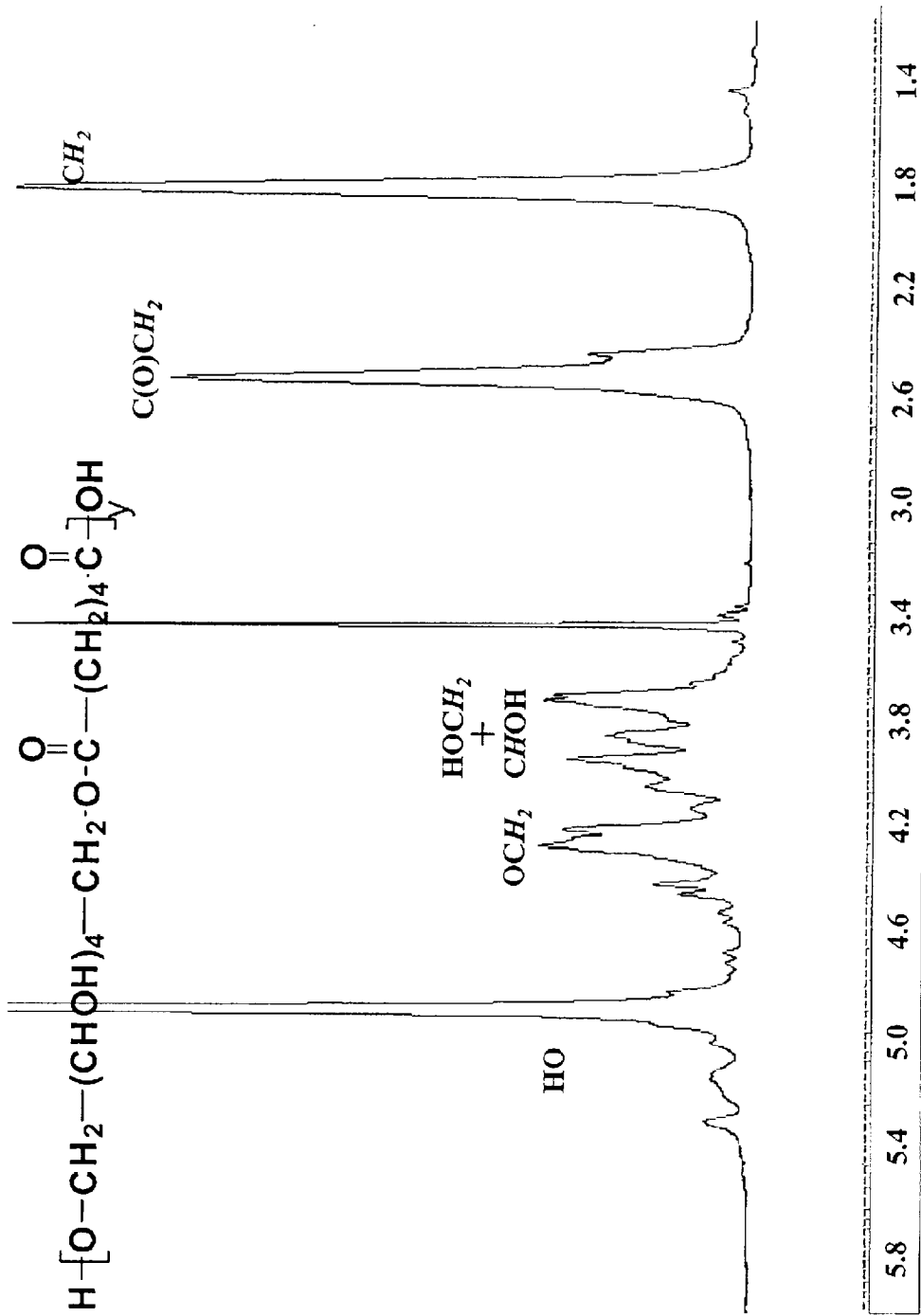
FIG. 2 is the $^1$HNMR spectra of polysorbityladipate in MeOH.

Adipic acid (Aldrich 2.0 g, 0.1 mole, 1 eq.) was suspended in the melt of sorbitol (Aldrich, 2.492 g, 0.1 mole, 1 eq.) at 105° C. The temperature of the reaction mixture was brought to 90–95° C. and then Novozyme-435 (500 mg) was charged to the reaction flask. The reaction was maintained at between 90–95° C. for 48 hr. The reaction was subjected to reduced pressure (from 30–50 mmHg) initially at 50 mmHg and with time it was raised to 20 mmHg to remove water from the system. For all other details see the General Process Methods above. The reaction product obtained after 48 hr, was fractionated in acetone. The acetone insoluble material was >90% of the product and had an $M_n$ of 22.6 kg/mol and $M_w/M_n$ of 1.7 (by light scattering). NMR analysis showed that the product was >90% regioselective at 1,6 position of sorbitol (FIG. 2).

Example 3

Simultaneous Condensation and Ring-Opening Polymerization of a Mixture Consisting of a Diacid, Diol, and Lactone Scheme 5:

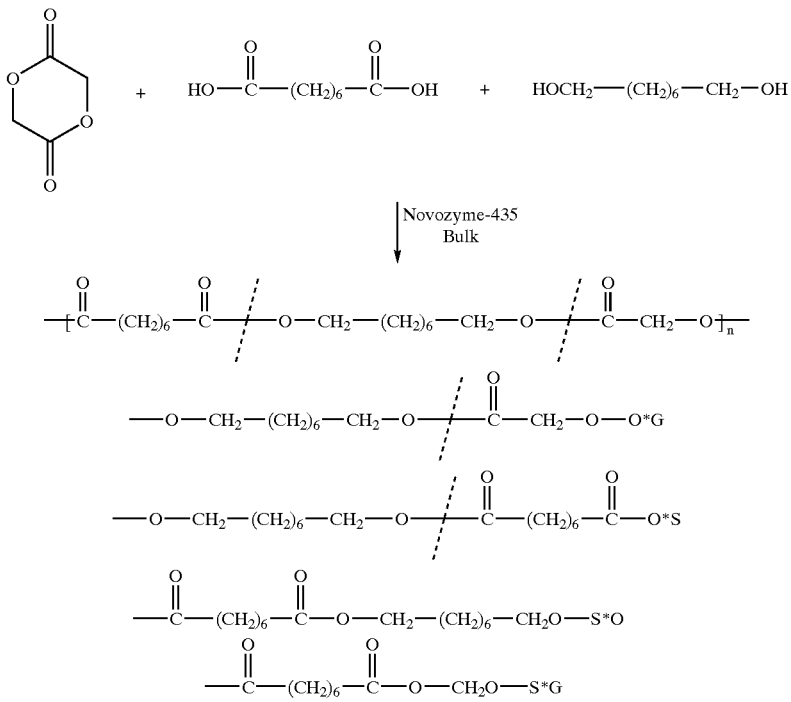

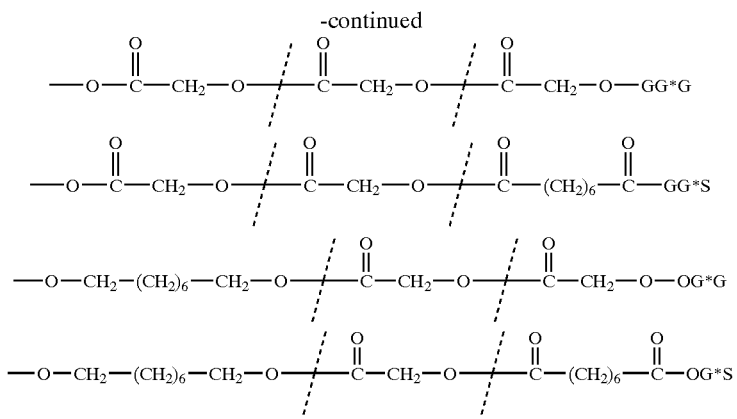

Materials: Sebacic acid, Octanediol, Glycolide, Novozyme-435.

Sebacic acid (Aldrich, 3.23 g, 1 eq.) was suspended in the melt of octanediol (Aldrich, 2.34 g, 1 eq.) and glycolide (928 mg, 0.5 eq) at 90° C. Novozyme-435 (325 mg) was charged to the flask and the reaction was continued for 2 hr. The reaction was then subjected to reduced pressure (from 30–50 mmHg) initially at 50 mmHg and with time it was raised to 30 mmHg to remove water from the system. For all other details see the General Process Methods above. The reaction product obtained after 48 hr was fractionated in methanol. The methanol insoluble material was >90% of the product and had an $M_n$ of 12.1 kg/mol and $M_w/M_n$ of 1.9 (by GPC).

Figure 3:
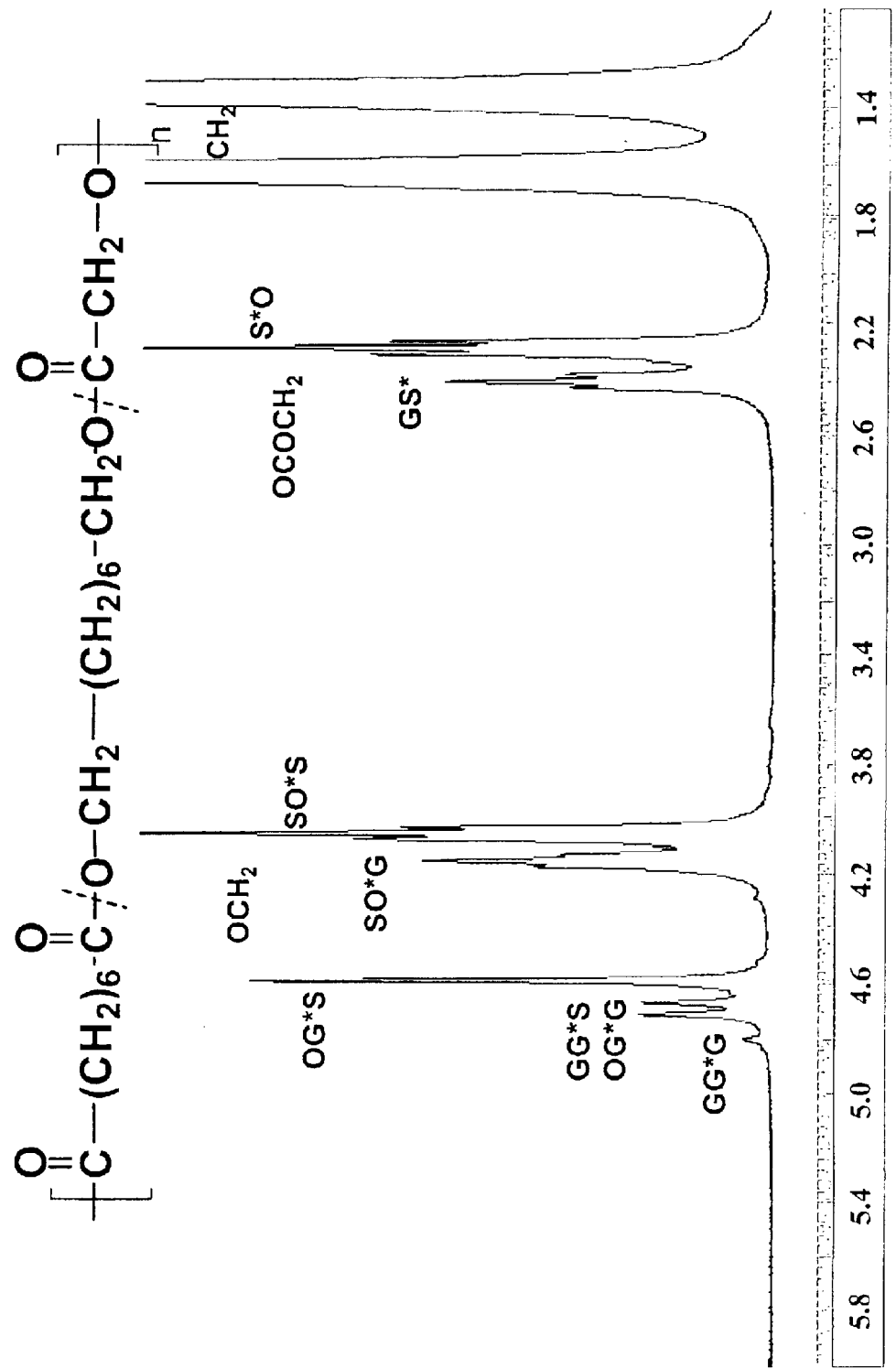
FIG. 3 is the $^1$HNMR spectra of polyoctamethylene sebacate with 23 mol % glycolide incorporation in CDCl$_3$.
Figure 4:
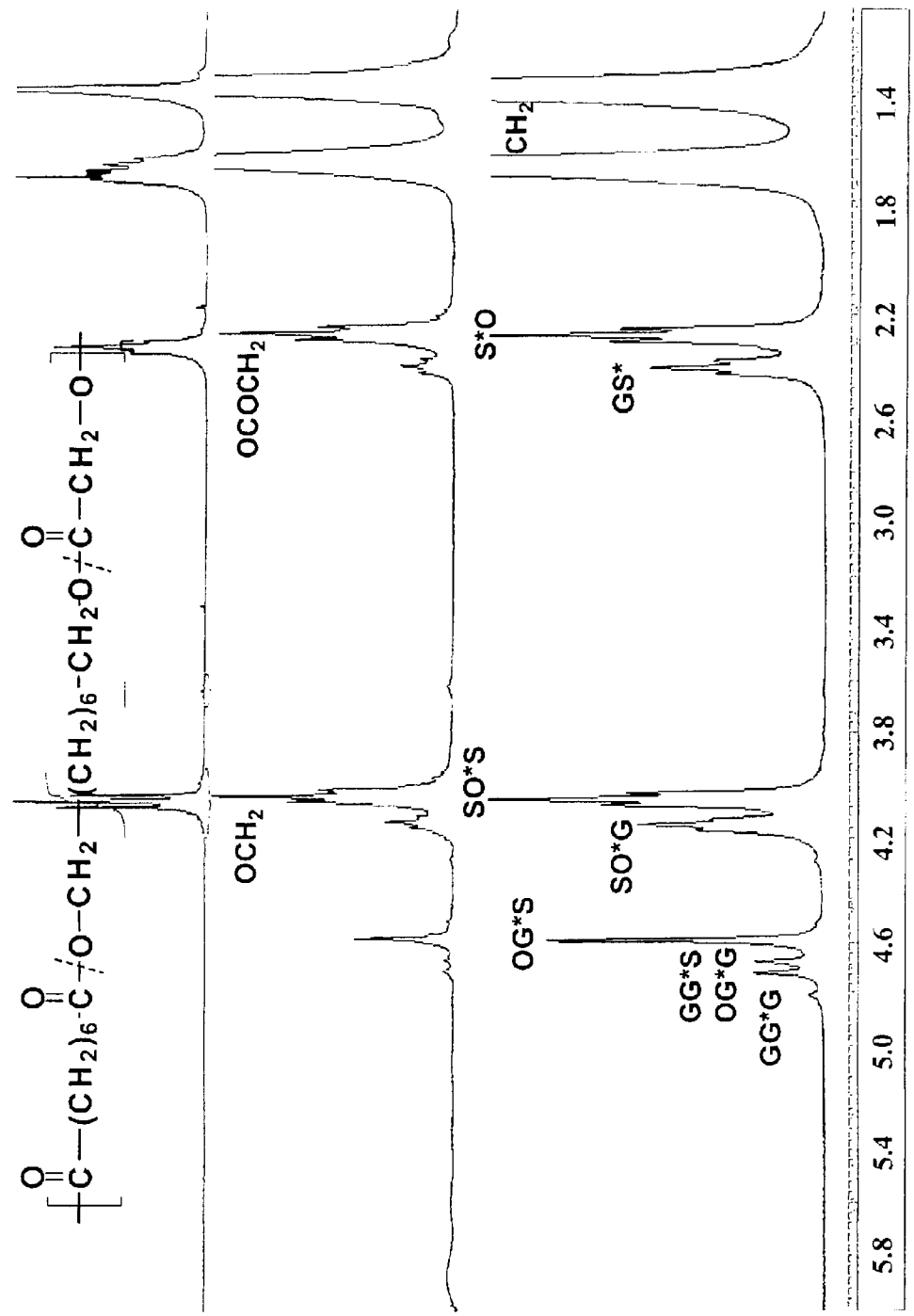
FIG. 4 is the $^1$HNMR spectra of polyoctamethylene sebacate with 23 mol % glycolide incorporation in CDCl$_3$.

By variation in the glycolide added to the monomer feed, the incorporation of glycolide has been varied from 6 to 35 mol %. The molecular weight of these glycolide-containing terpolymers varied from 1 to 30 kg/mol. An inverse relationship was found between glycolide content and product molecular weight. Thus, as the glycolide content in the monomer feed was increased, the resulting product molecular weight was lower. The incorporation of glycolide and molecular weights of the products increased with time from 2 to 48 hr. The mol % incorporation of glycolide was calculated based on the relative intensity of the $^1$H-NMR signals due to glycolide (2H δ4.5–4.7) and octanediolester (4H, δ3.9–4.25) (see FIG. 3). The microstructure of the terpolymer was analyzed be $^1$H-NMR and a representative structure of the polymer is given in Scheme 5. The proton signals (in $CDCl_3$) were observed at δ4.80 (GG*G O=$COCH_2$), 4.74 (GG*O, O=$COCH_2$) 4.68 (SG*G, O=$COCH_2$) 4.58 (SG*O, O=$COCH_2$), 4.16 (O*G, O=$COCH_2$), 4.06 (O*S, O=$COCH_2$), 3.64 ($CH_2CH_2OH$), 2.40 (S*G O=$CCH_2$), 2.28 (S*O, O=$CCH_2$), 1.68 & 1.32 (all other $CH_2$). For the above, S, G, and O are sebacate, glycolate dimeric form and octanediol, respectively. The assignment of the signals was based on the comparative study of the proton spectrum of polyoctyladipate and the copolymers with different levels of glycolide relative to octanediol and sebacate (see FIG. 4). The above polyesters exhibited moderate to high thermal stability.

Example 4

Simultaneous Condensation and Ring-Opening Polymerization of a Mixture Consisting of a Diacid, Diol, Polyol and Lactone

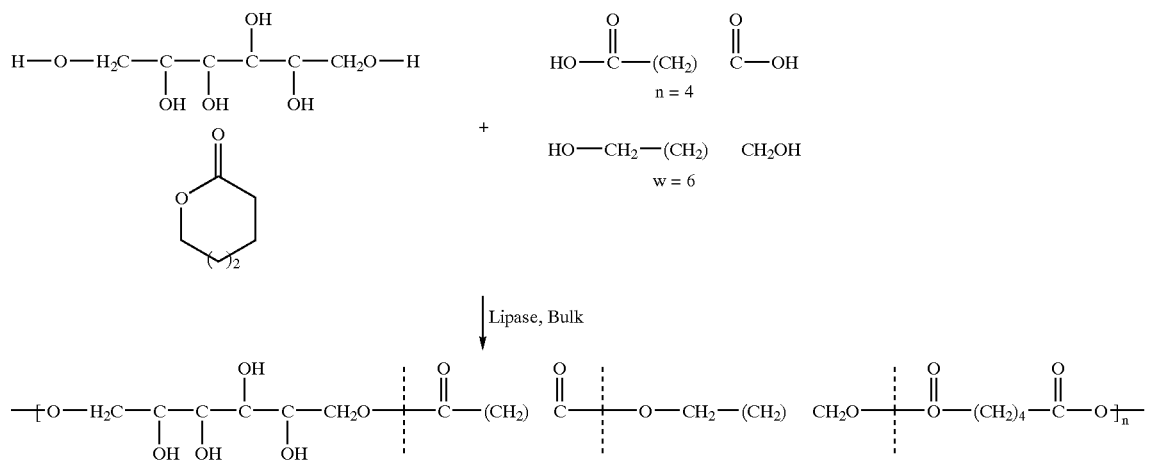

Materials: Sebacic Acid, Octanediol, Sorbitol, Caprolactone, Novozyme-435.

Figure 5:
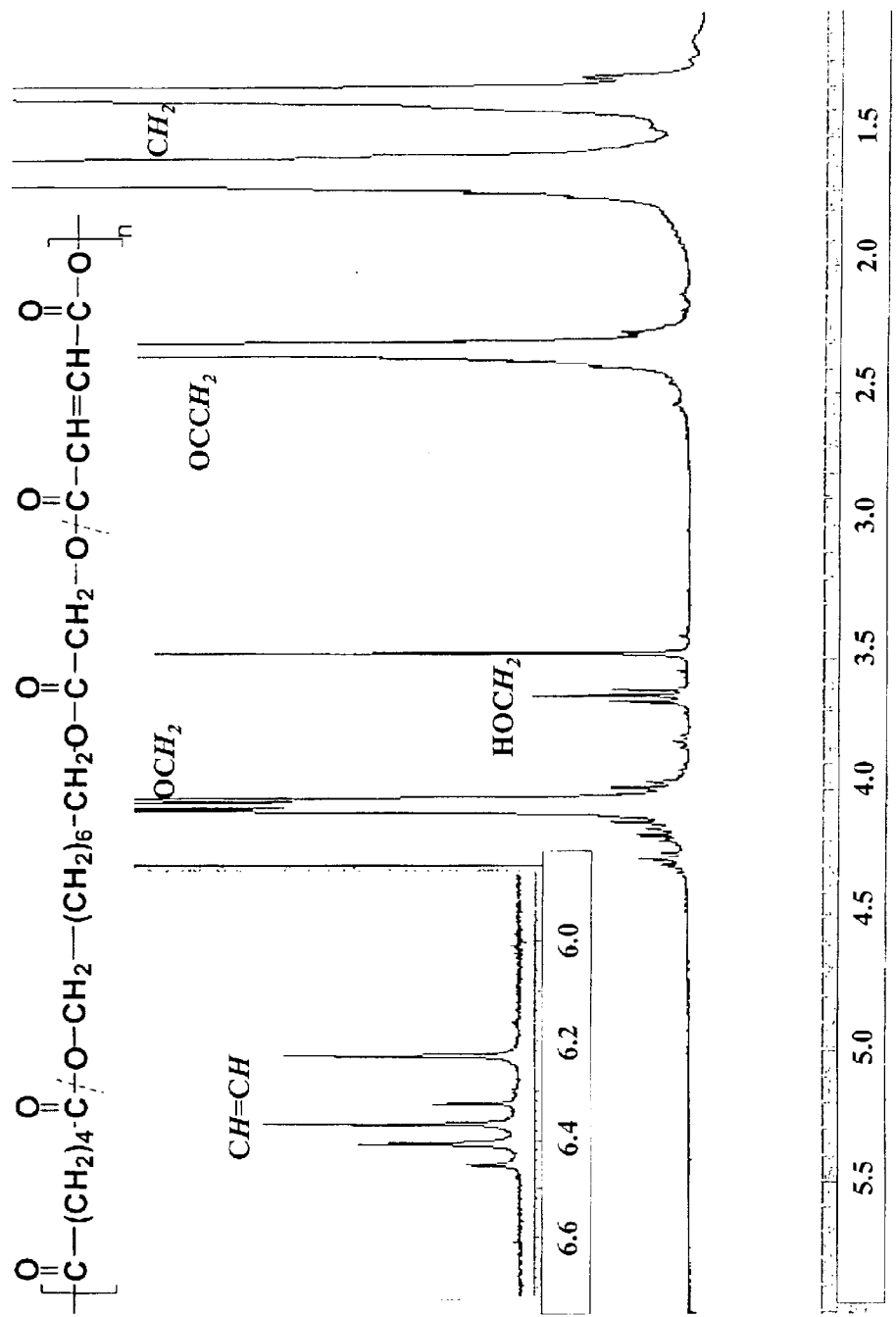
FIG. 5 is the $^1$HNMR spectra of polyoctamethylene adipate with 1–2 mol % maleic anhydride incorporation in CDCl$_3$.

Sebacic acid (Aldrich, 3.29 g, 0.40 eq.) was suspended in the melt of octanediol (Aldrich, 2.49 g, 0.425 eq.), sorbitol (Aldrich, 0.55 g, 0.075 eq.) and caprolactone (0.469 g, 0.1 eq.) at 90–92° C. Novozyme-435 (0.337 g) was charged to the flask and the reaction was continued for 2 hr. The reaction was then subjected to reduced pressure (from 30–50 mmHg) initially at 50 mmHg and with time it was raised to 30 mmHg to remove water from the system for 48 hr. For all other details see the General Process Methods above. The reaction product obtained after 48 hr was fractionated in methanol. The methanol insoluble material was >90% of the product and had a $M_n$ of 4.8 kg/mol and $M_w/M_n$ of 1.58. In general it was observed that the increase in polyol concentration decreased the product molecular weight.

at 70° C. for 2 hr at ambient pressure. Subsequently, to remove water from the system, the reaction was placed in vacuo at pressures starting at 50 mmHg and going as low as 30 mmHg. For all other details of the method used see the General Process Methods above. The reaction product obtained after 24 hr was fractionated in methanol. The methanol insoluble material was >93% of the product and had a $M_n$ of 5.2 kg/mol (1.48) by NMR. The incorporation of maleic anhydride in the main chain polyester was calculated based on the relative intensity of the $^1$H-NMR signals due to maleic acid ester (—CH=CH—COOR, 2H, δ5.9–6.4) and octanediolester (OCOCH$_2$—(CH$_2$)$_6$—CH$_2$OCO, 4H, δ3.9–4.2) (FIG. 5).

Example 5

Diacid, Diol and an Anhydride Condensation

Scheme 7:

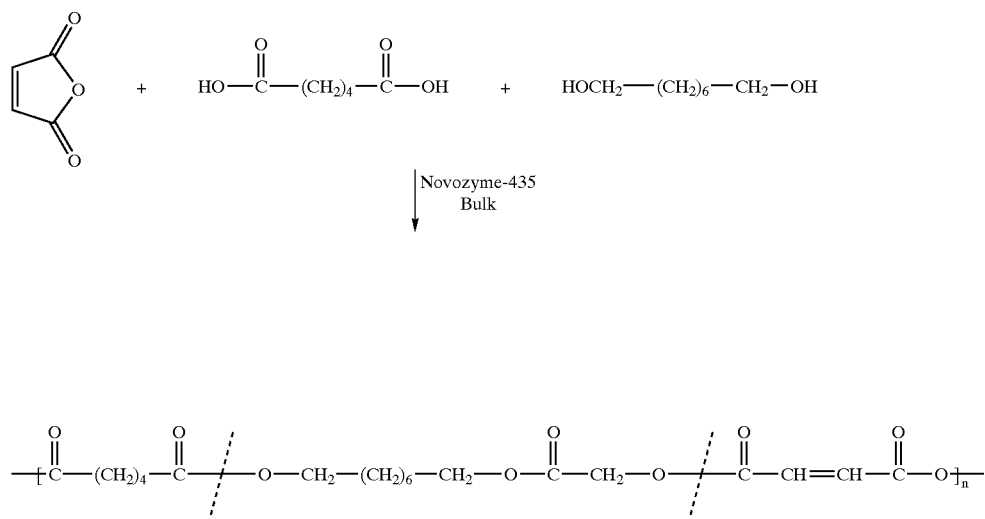

Materials: Adipic acid, Octanediol, Maleic anhydride, Novozyme-435.

Adipic acid (Aldrich 1.42 g, 0.99 eq.) was suspended in the melt of octanediol (Aldrich, 1.46 g, 1 eq.) and maleic anhydride (46 mg, 0.05 eq.) at 70° C. Novozyme-435 (142 mg) was charged to the flask and the reaction was performed

Example 6

Diacid, Diol and Polyols Condensation

Scheme 8:

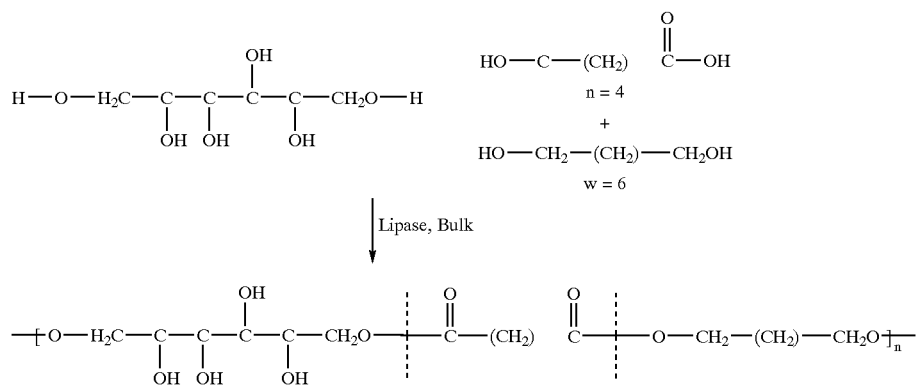

Materials: Adipic Acid, Octanediol, Sorbitol, Novozyme-435.

Adipic acid (Aldrich 2.92 g, 1 eq.) was suspended in the melt of octanediol (Aldrich, 2.044 g, 0.7 eq.) and sorbitol (1.093 g, 0.3 eq.) at 90–95° C. Novozyme-435 (600 mg) was charged to the flask and the reaction was placed at 90–95° C. for 1 hr. The reaction was then placed in vacuo (10 mmHg) and continued at 90–95° C. for an additional 41 hr. The reaction product obtained after 41 hr was fractionated in cold methanol. The methanol insoluble material was >85% of the product and had an $M_n$ and $M_w/M_n$ of 38.2 kg/mol and 1.6, respectively, by light scattering. Additional details of the method used are described above in the General Process Methods.

Figure 6:
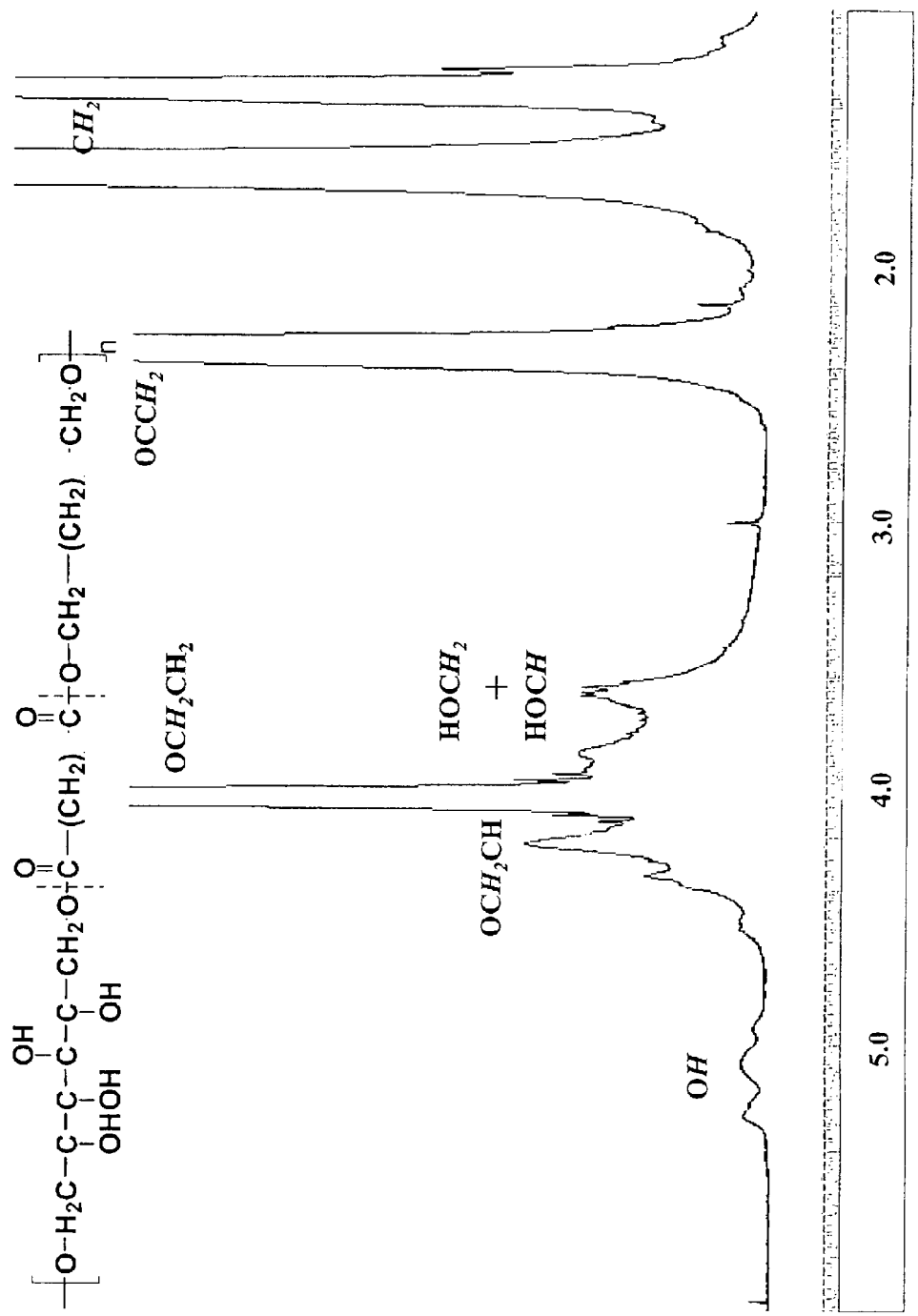
FIG. 6 is the $^1$HNMR spectra of sorbitol incorporated polyoctamethylene adipate in CDCl$_3$.
Figure 7:
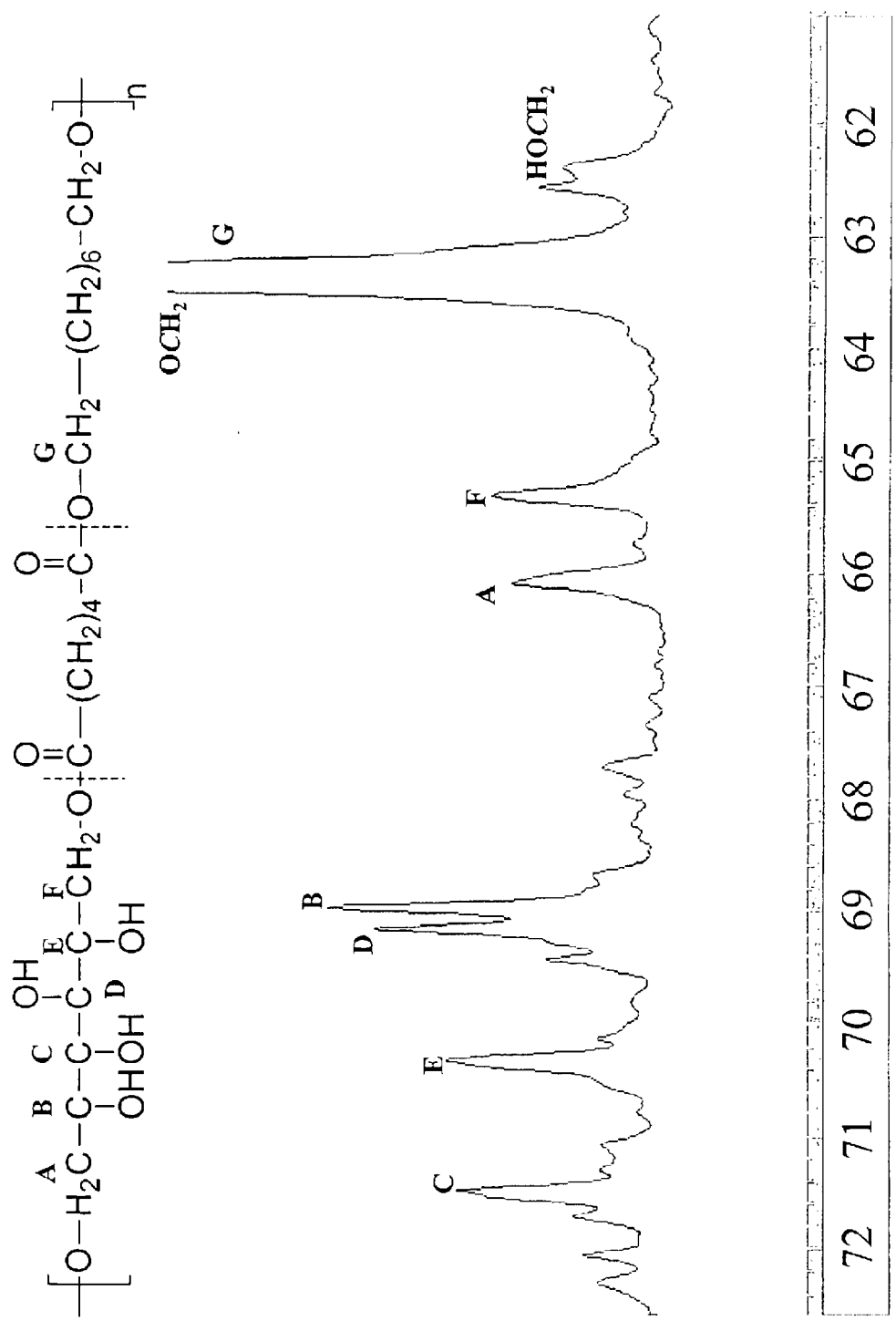
FIG. 7 is the expanded $^{13}$CNMR spectrum of 15% sorbitol incorporated polyoctamethylene adipate terpolymer in DMSO.

The incorporation of sorbitol in the product was 15 mol % of the repeat units. Thus, the copolymer formed was poly(adipic acid-co-15 mol % sorbitol-co-35 mol % octanediol). This product is soluble in chloroform, THF, DMF, DMSO, but was insoluble in methanol, water, diethylether, hexane and acetone. This product was completely soluble in chloroform and, therefore, should have little or no crosslinks. The structure of the polymer was confirmed by $^1$H- and $^{13}$C-NMR spectroscopy in CDCl$_3$ (FIGS. 6 and 7). The signals in the proton spectra appeared as a broad multiplet at δ4.80–3.6 where the contributions of O=COCH$_2$ and CH$_2$CH$_2$OH from octanediol were centered at 3.9–4.2 and 3.64, respectively. Signals from protons corresponding to sorbitol units that also appeared in the δ4.80–3.6 region include CHOH, CHOHCH$_2$OH, and O=COCHOHCH$_2$. The $^1$H-NMR signals at δ2.34, 1.68, and 1.32 ppm were assigned to (O=CCH$_2$) and to the other methylenes in the main chain. The assignments of the signals were based on the comparative study of the proton spectra of poly (octamethylene-co-sorbitol) with different levels of sorbitol incorporation. Regioselectivity of the product formed was analyzed by comparing the terpolymer and sorbitol by 2D NMR spectroscopy ($^1$H—$^1$H, HMQC). It was observed that sorbitol was acylated mainly (>95%) at the 1 and 6 positions in the terpolymer. The incorporation of sorbitol and its distribution in the polyester chain was determined using $^1$H and $^{13}$C NMR in CDCl$_3$. Sorbitol incorporation was approximately calculated based on the relative intensity of the signals due to sorbitol (4H δ4.4–4.2) and octanediolester (4H, δ3.9–4.2), respectively, in the $^1$H-NMR spectrum. The determination of sorbitol content in the copolymer was further supported by observation of the relative intensity of $^{13}$C-NMR signals corresponding to A*O and A*S at 34.35, 34.30 and 24.41, 24.28 ppm in CDCl$_3$, respectively (FIG. 7). The later was used to calculate the % sorbitol incorporation. The microstructure of the terpolymer was analyzed be $^{13}$C NMR (FIG. 7). The signal intensity at 64.28 (OCOCH$_2$) and 34.30 [C(O)CH$_2$] due to O*AS and A*S matched well and thus the distribution of sorbitol in the polymer chain is random. The above polyesters exhibited high thermal stability.

Example 6

Diacid, Diol and Carbonate Condensation

Scheme 9:

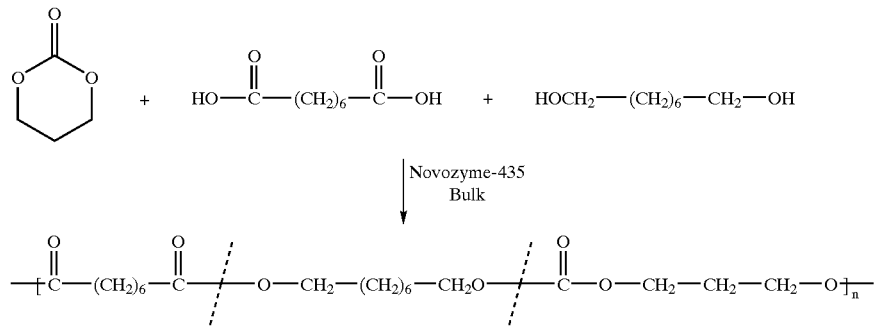

Materials: Sebacic acid, Octanediol, Trimethylene carbonate, Novozyme-435.

Figure 8:
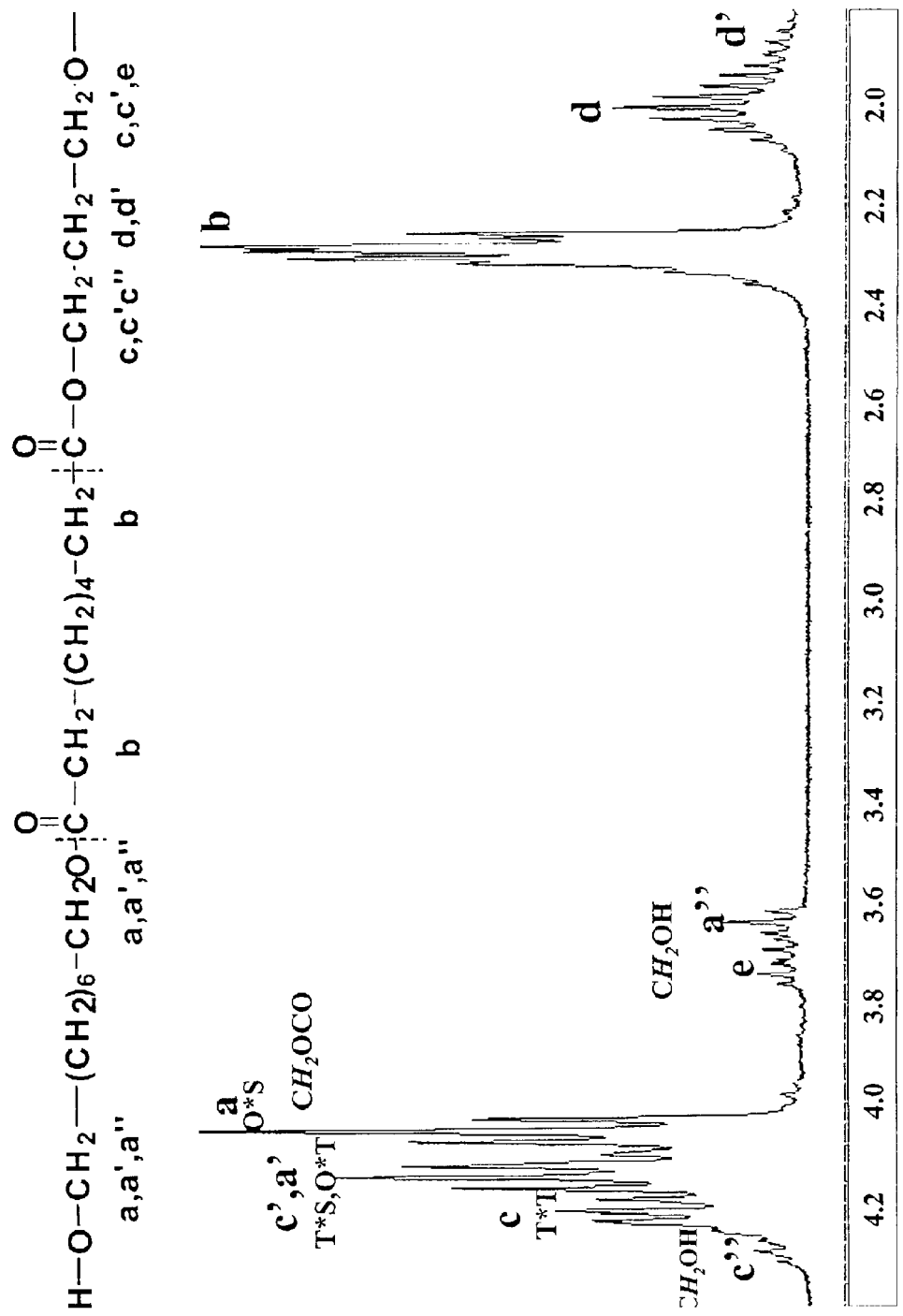
FIG. 8 is the expanded $^1$HNMR spectrum of 35% TMC incorporated polyoctamethylene sebacate terpolymer in CDCl$_3$.

Sebacic acid (Aldrich 3.23 g, 1 eq.) was suspended in the melt of octanediol (Aldrich, 2.34 g, 1 eq.) and TMC (0.816 g, 0.5 eq.) at 90–95° C. Novozyme-435 (319 mg) was charged to the flask and the reaction was placed at 90° C. for 3 hr. The reaction was then placed in vacuo (10 mmHg) and continued at 90–95° C. for an additional 45 hr. The reaction product obtained after 48 hr was fractionated in cold methanol. The methanol insoluble material was >90% of the product and had an $M_n$ and $M_w/M_n$ of 6.66 kg/mol and 1.77, respectively. Additional details of the method used are described above in the General Process Methods. The incorporation of TMC in the product was varied from 5–50 mol % of the repeat units and was based on the relative intensity of the signal at d 2.30 (4H) vs. 2.02(2H). This product is soluble in chloroform, THF, DMF, DMSO, but was insoluble in methanol, water, diethylether and hexane. The structure of the polymer was confirmed by $^1$H- and $^{13}$C-NMR spectroscopy in CDCl$_3$ (FIG. 8). The microstructure of the polymer was analyzed from proton NMR spectrum.

Signals from protons corresponding to T*T-, T*S, O*T and O*S appeared in the δ4.20, 4.12, 4.04, respectively (FIG. 8). The distribution of the TMC in the polyester chain was found to be nearly random.

Example 7

Diacid, Diol and Hydroxyacids Condensation

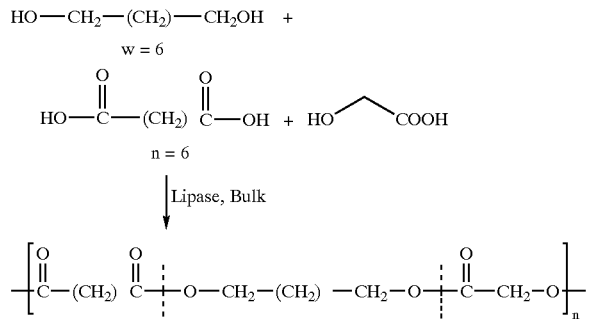

Materials: Sebacic Acid, Octanediol, Glycolic Acid, Novozyme-435.

Sebacic acid (Aldrich, 3.24 g, 1 eq.) was suspended in the melt of octanediol (Aldrich, 2.34 g, 1 eq.) and glycolic acid (304 mg, 0.25 eq.) at 90° C. Novozyme-435 (294 mg) was charged to the flask and the reaction was continued for 2 hr. The reaction was then subjected to reduced pressure (from 30–50 mmHg) initially at 50 mmHg and with time it was raised to 30 mmHg to remove water from the system. For all other details see the General Process Methods above. The reaction product obtained after 48 hr was fractionated in methanol. The methanol insoluble material was >90% of the product and had an $M_n$ of 3970 kg/mol and $M_w/M_n$ of 1.63.

Figure 9:
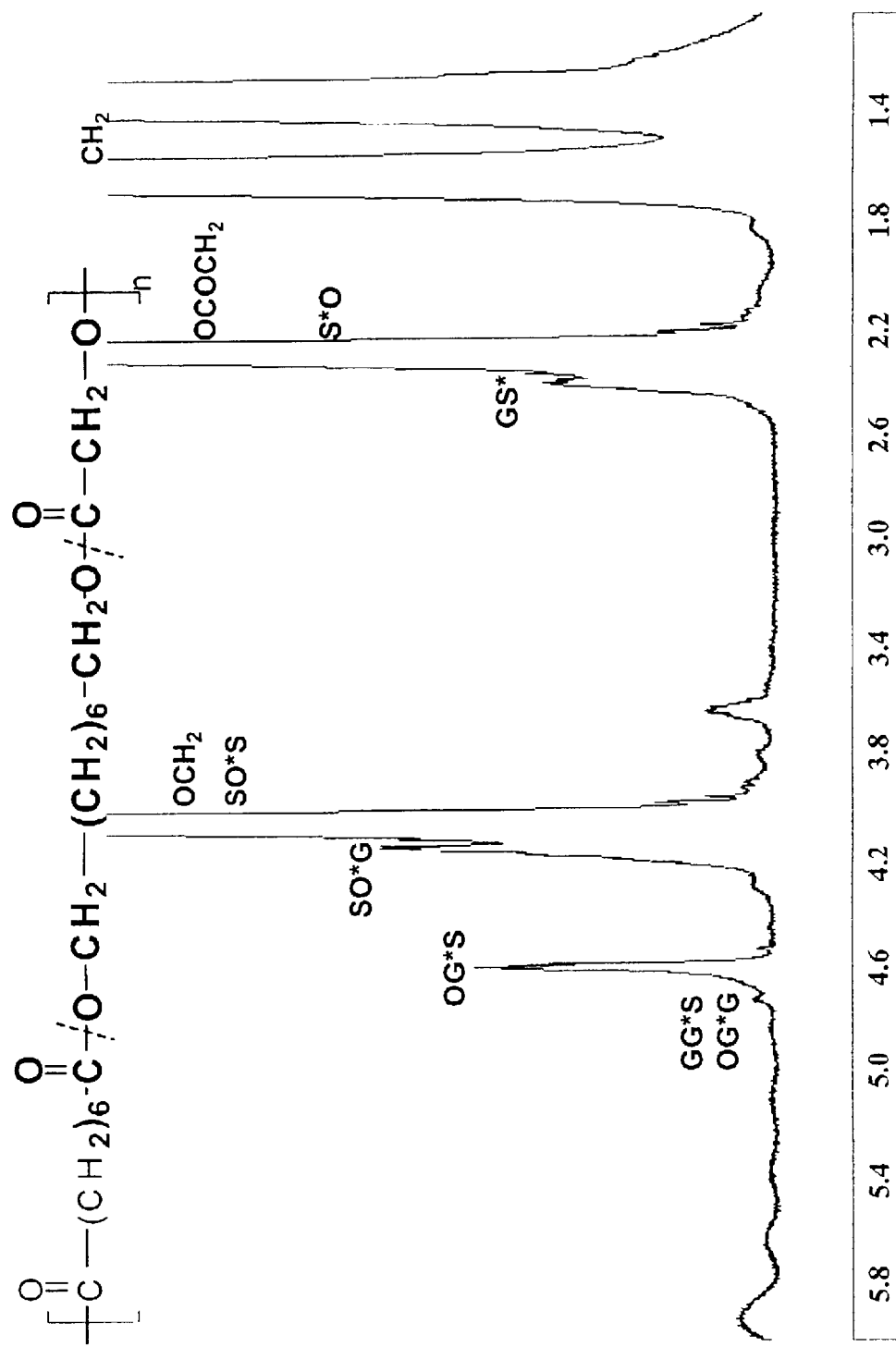
FIG. 9 $^1$HNMR spectra of polyoctamethylene sebacate with 11 mol % glycolic acid incorporation in CDCl$_3$.

By variation in the glycolic acid added to the monomer feed, the incorporation of glycolic acid has been varied from 3 to 11%. The molecular weight of these glycolic acid-containing terpolymers varied from 1000–14,300 g/mol. An inverse relationship was found between glycolic acid content and product molecular weight. Thus, as the glycolic acid content in the monomer feed was increased, the resulting product molecular weight was lower. The incorporation of glycolic acid and molecular weights of the products increased with time from 2 to 48 hr. The mol % incorporation of glycolic acid was calculated based on the relative intensity of the $^1$H-NMR signals due to glycolic acid (2H δ4.5–4.7) and octanediolester (4H, δ3.9–4.25) (FIG. 9). The microstructure of the terpolymer was analyzed be $^1$H-NMR and a representative structure of the polymer is given in Scheme 5. The proton signals (in CDCl$_3$) were observed at δ4.74 (SG*G, GG*O, O=COCH$_2$), 4.60 (SG*O, O=COCH$_2$), 4.16 (O*G, O=COCH$_2$), 4.06 (O*S, O=COCH$_2$), 3.64 (CH$_2$CH$_2$OH), 2.40 (S*G O=CCH$_2$), 2.28 (S*O, O=CCH$_2$), 1.68 & 1.32 (all other CH$_2$). For the above, S, G, and O are sebacate, glycolic acid and octanediol, respectively.

Thermal Stability and Transitions of Selected Copolymers

A compilation of results obtained by the Thermogravimetric Analysis (TGA), Differential Scanning Calorimetry (DSC), Wide-Angle X-ray Scattering (WAXS) and Dynamic Mechanical Analysis (DMA) of copolymers prepared in this invention is shown in Table 1. TGA was used to study the thermal stability of poly(octamethylene adipate) (POA) and the copolymer described above. TGA thermograms recorded using a heating rate of 20° C./minute under a nitrogen atmosphere showed that these polymers exhibit high thermal stability. The extrapolated onset decomposition temperature was about 400° C. for POA and poly(octamethylene adipate-co-sorbitol/glycerol adipate) copolymers.

For example, DSC analyses of POA and poly (octamethylene adipate-co-sorbitol/glycerol) were conducted with a heating rate of 20° C./minute. The melting temperature of POA was 72° C. (peak value) during a second heating after slow cooling from the melt. In contrast, after the same thermal history, the melting temperature of poly (octamethylene adipate-co-sorbitol/glycerol) was lower. The melting enthalpy of POA was higher as compared to sorbitol/glycerol incorporated terpolymer. Depression of the melting temperature due to incorporation of sorbitol is expected. With the incorporation of 10 mol % of sorbitol repeat units into POA, the resulting product remains semi-crystalline. Due to the rapid crystallization of POA during cooling from the melt, a glass transition was not observed. However, a small glass transition was observed at −19° C. for the terpolymer with 29% sorbitol.

For example, WAXS experiments also were conducted for POA and for poly(octamethylene adipate-co-sorbitol/ glycerol). The degree of crystallinity of POA was estimated to be 64%. However the degree of crystallinity of poly (octamethylene adipate-co-sorbitol) was much lower than POA. Thus, with an increase in the sorbitol/glycerol content in POA copolymers a decrease in the degree of crystallinity was observed. This is expected since the sorbitol/glycerol repeating units act as impurities that disrupt the crystalline organization of POA.

For example, dynamic mechanical measurements were carried out for POA and for poly(octamethylene adipate-co-sorbitol/glycerol) with a heating rate of 3° C./minute and a frequency of 3 Hz. The α relaxation peaks of loss modulus (E")—temperature spectra were taken as the glass transition temperatures of the amorphous fraction of the polymers. It was observed that the glass transition temperature of these polymers increases with the increasing molar percentage of sorbitol in the feed composition. One reason is that the interaction between polymer chains increases with the increasing amount of sorbitol incorporated in the polymer chains.

TABLE 1

| No | mol % gly in feed | mol % sorbitol in feed | $T_d$ (° C.) | $T_m$ (° C.) | $\Delta H_m$ (J/g) | $T_g$ (° C.) | $\chi_c$ (%) |
|---|---|---|---|---|---|---|---|
| 1 | 0 | 0 | 395 | 74 | 136 | −33 | 64 |
| 2 | 5 |   | 389 | 69 | 133 | −32 | 60 |
| 3 | 10 |   | 400 | 68 | 110 | −32 |    |
| 4 | 20 |   | 393 | 62 | 97 |    | 52 |
| 5 | 30 |   | 377 | 58 | 93 |    |    |
| 6 |   | 10 | 397 | 66 | 101 | −20 | 47 |
| 7 |   | 20 | 390 | 62 | 82 | −120 | 41 |
| 8 |   | 30 | 393 | 58 | 59 | −7.8 |    |
| 9 |   |   | 392 | 54 | 80 |    |    |

Notes for Table 1: the decomposition temperature $T_d$ is from TGA, extrapolated onset temperatures were taken; the melting temperature $T_m$ is from first heating of DSC, peak value; the melting enthalpy $\Delta H_m$ is from first heating DSC; the glass transition temperature $T_g$ is from DMA; the degree of crystallinity χ of different copolyesters is from WAXS; and the molar ratio of hexanetriol:adipic acid:octanediol in the feed composition is 30:100:70.

The above description sets forth the best mode of the invention as known to the inventors at this time, and is for illustrative purposes only, as will become apparent to one skilled in the art to make modifications to this process without departing from the spirit and scope of the invention and its equivalents as set forth in the appended claims.

What is claimed is:

1. A method for enzymatic condensation polymerization comprising the steps of:
   a. combining a preselected quantity of an enzyme; at least one compound selected from the group consisting of diols and polyols; a diacid; and a compound selected from the group consisting of hydroxyacids, lactones, carbonates, anhydrides, amino alcohols, and combinations thereof, in a reaction vessel;
   b. heating the reaction vessel containing the enzyme, the diol and/or polyol, and the diacid to a preselected temperature; and
   c. maintaining the reaction vessel containing the enzyme, the diol and/or polyol, and the diacid at the preselected temperature for a preselected time,
   thereby producing a condensation polymer.

2. The method as claimed in claim 1, wherein the condensation polymer has high regioselectivity, high molecular weight, and narrow polydispersity.

3. The method as claimed in claim 1, further comprising the step of subjecting the contents of the reaction vessel to reduced pressure for at least a portion of the time that the reaction vessel is maintained at the preselected temperature.

4. The method as claimed in claim 1, wherein an enzyme, a diol, a polyol, and a diacid are combined in the reaction vessel.

5. The method as claimed in claim 2, resulting in a condensation polymer having a regioselectivity of between 70 and 99%.

6. The method as claimed in claim 2, resulting in a condensation polymer that has a weight average molecular weight of between 2 000 and 200 000.

7. The method as claimed in claim 2, resulting in a condensation polymer having a polydispersity of between 1.1 and 7.0.

8. The method as claimed in claim 1, wherein the preselected temperature is between 50° C. and 120° C.

9. The method as claimed in claim 8, wherein the preselected temperature is between 65° C. and 90° C.

10. The method as claimed in claim 1, wherein the polyol has two reactive hydroxyls and the molar ratio of acid to reactive hydroxyls is 1:1.

11. The method as claimed in claim 1, wherein the preselected time is between 1 hour and 48 hours.

12. The method as claimed in claim 11, wherein the preselected time is between 1 hour and 18 hours.

13. The method as claimed in claim 3, wherein the contents of the reaction vessel are subjected to reduced pressure no sooner than 1 hour after the reaction vessel has been maintained at the preselected temperature.

14. The method as claimed in claim 1, wherein the diol is selected from the group consisting of α,ω-diols that contain from 2 to 32 carbon atoms.

15. The method as claimed in claim 14, wherein the diol has the structure $HOH_2C—R—CH_2OH$ and R is selected form the group consisting of:
   a. $(CH_2)_n CH_x(R_1)(R_2)(CH_2)_m$, where $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family, and where $R_1$ may be along the chain, a pendant group that is attached directly to carbon that is along the chain, attached indirectly to the main chain through a spacer group; $R_2$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family; n=0–32; m=0–32; and x=0–2,
   b. $CH=CH$;
   c. $CH_2CH=CHCH_2$;
   d. $C\equiv C$;
   e. $CH_2CH\equiv CHCH_2$; and
   f. $HO(CH_2)_x(—Si[R']_2—O—)_n(CH_2)_xOH$, where x=1–10, n=1 to 1000, and R'=methyl, phenyl, ethyl, propyl, butyl, and any mixture of these groups.

16. The method as claimed in claim 14, wherein the diol is selected from the group consisting of ethylene glycol, 1,3-propane diol, 1,4-butanediol, 1,5-pentanediol, 1,6-hexanediol, 1,8-octanediol, 1,12-dodacanediol.

17. The method as claimed in claimed in claim 14, wherein the diols comprise as side groups or along the chain carbon-carbon double or triple bonds, ketones, esters, nitriles, isonitriles, nitrates, sulfates and silicones.

18. The method as claimed in claim 1, wherein the diacid is an aliphatic dicarboxylic acid.

19. The method as claimed in claim 18, wherein the aliphatic diacid has the structure $HOOC—R—COOH$ where R is selected from the group consisting of:
   a. $(CH_2)_n$, where n=1–32;
   b. $(CH_2)_n CH_x(R_1)(R_2)(CH_2)_m$, where $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family, and where $R_1$ may be along the chain, a pendant group that is attached directly to carbon that is along the chain, attached indirectly to the main chain through a spacer group; $R_2$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family: n=0–32; m=0–32: and x=0–2;
   c. $CH=CH$;
   d. $CH_2CH=CHCH_2$; and
   e. $(CH_2)_x(—Si[R']_2—O—)_n(CH_2)_x$, where x=1–10, n=1 to 1000, and R'=methyl, phenyl, ethyl, propyl, butyl, and any mixture of these groups.

20. The method as claimed in claim 19, wherein the R-groups may include as side groups or along the main chain carbon double or triple bonds, ketones, esters, nitriles, isonitriles, nitrates, sulfates, phosphates and silicones.

21. The method as claimed in claim 1, wherein the polyol is selected from the group consisting of polyols having at least three hydroxyl groups of which at least two must be primary or highly reactive secondary hydroxyl groups.

22. The method as claimed in claim 21, wherein the polyol is selected from the group consisting of glycerol, erythritol, pentaerythritol, xylitol, ribitol, sorbitol, 1,2,6 hexane triol, 1,2,4-butanetriol, maltose, sucrose, and lactose.

23. The method as claimed in claim 1, wherein the lactone is selected from the group consisting of lactones with 4 to 16 membered rings.

24. The method as claimed in claim 23, wherein the lactone is selected from the group consisting of butyrolactone, δ-valerolactone, ε-caprolactone, β-octanolide, ω-dodecanolide, ω-pentadecalactone, lactide, dioxanone and glycolide.

25. The method as claimed in claim 1, wherein the carbonate is selected from the group consisting of trimethylene carbonate, 1-methyltrimethylenecarbonate, 1,3-dimethyltrimethylenecarbonate, 2,2-dimethyltrimethylene carbonate, 1,2-O-isopropylidene-[D]-xylofuranose-3,5-cyclic carbonate, and 1,2-isopropylidene glucofuranose -4,4-bishydroxymethyl cyclic carbonate.

26. The method as claimed in claim 1, wherein the enzyme is selected from the group consisting of lipases, proteases and esterases.

27. The method as claimed in claim 26, wherein the enzyme is selected from the group consisting of Novozyme-435 (*Candida antarctica* Lipase B), Lipase IM (*Mucor meihei*), PS-30 (*Pseudomonas Cepacia*), PA (*Pseudomonas aeruginosa*, Lipase PF (*Pseudomonas fluoresenses*), lipase from *Candida cylinderacea*, porcine pancreatic lipase and the lipase from *Aspergillus niger*. Proteases such as α-Chymotrypsin Type II from bovine pancreas, papain, pepsin from porcine stomach mucosa, Protease Type XIII from *Aspergillus saitoi*, Protease (Pronase E) Type XIV from *Stroptomyces griseus*, Protease Type VIII (*Subtilisin Carlsberg*) from *Bacillus lichenifomis*, and Protease Type X (Thermolysin) from *Bacillus thermoproteolyticus rokko*, and Protease Type XXVII (Nagarse).

28. A method for enzymatic condensation polymerization comprising the steps of:
  a. adding a diol to a reaction vessel;
  b. adding a diacid to the reaction vessel containing the diol;
  c. adding a polyol to the reaction vessel containing the diol and the diacid, wherein the polyol is selected from the group consisting of polyols having at least three hydroxyl groups of which at least two must be primary or highly reactive secondary hydroxyl groups;
  d. adding an enzyme to the reaction vessel containing the diol and the diacid; and
  e. maintaining the reaction vessel containing the diol, the diacid and the enzyme at a preselected temperature for a preselected time,
  thereby producing a condensation polymer.

29. The method as claimed in claim 28, wherein the condensation polymer has high regioselectivity, high molecular weight, and narrow polydispersity.

30. The method as claimed in claim 28, wherein the diol is heated to the preselected temperature prior to the addition of the diacid.

31. The method as claimed in claim 30, wherein the diacid is added to the reaction vessel in such a fashion so as to maintain a heterogeneous mixture with the diol.

32. The method as claimed in claim 31, further comprising the step of subjecting the contents of the reaction vessel to reduced pressure for at least a portion of the time that the reaction vessel is maintained at the preselected temperature.

33. The method as claimed in claim 31, further comprising the step of subjecting the contents of the reaction vessel to sparging with dry air to remove any water from the reaction vessel for certain time periods during the reaction.

34. The method as claimed in claim 33, further comprising the step of subjecting the contents of the reaction vessel to air having humidity levels that maintain a water content in reactions that is optimal for enzyme activity.

35. The method as claimed in claim 34, wherein the water content in the reaction vessel is maintained at an optimal level through both the operations of applying vacuum and sparging with air at controlled humidity levels.

36. The method as claimed in claim 31, further comprising the addition of a compound selected from the group consisting of hydroxyacids, lactones, carbonates, anhydrides, amino alcohols, and combinations thereof to the reaction vessel.

37. The method as claimed in claim 29, resulting in a condensation polymer having a regioselectivity of greater than 70%.

38. The method as claimed in claim 29, resulting in a condensation polymer that has a weight average molecular weight between 2 000 and 200 000.

39. The method as claimed in claim 29, resulting in a condensation polymer having a polydispersity of between 1.1 and 7.0.

40. The method as claimed in claim 28, wherein the preselected temperature is between 50° C. and 120° C.

41. The method as claimed in claim 40, wherein the preselected temperature is between 65° C. and 90° C.

42. The method as claimed in claim 28, wherein the molar ratio of reactive hydroxyl to acid groups is 1:1.

43. The method as claimed in claim 28, wherein the preselected time is between 1 hour and 48 hours.

44. The method as claimed in claim 43, wherein the preselected time is between 1 hour and 18 hours.

45. The method as claimed in claim 32, wherein the contents of the reaction vessel are subjected to reduced pressure no sooner than 1 hour after the reaction vessel has been maintained at the preselected temperature.

46. The method as claimed in claim 28, wherein the diol is selected from the group consisting of α,ω-diols that contain from C-2 to C-14 carbon atoms.

47. The method as claimed in claim 46, wherein the diol has the structure $HOH_2C-R-CH_2OH$ and R is selected form the group consisting of:
  a. $(CH_2)_n CH_x(R_1)(R_2)(CH_2)_m$, where $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family, and where $R_1$ may be along the chain, a pendant group that is attached directly to carbon that is along the chain, attached indirectly to the main chain through a spacer group; $R_2$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family; n=0–32; m=0–32; and x=0–2;
  b. CH═CH;
  c. $CH_2CH$═$CHCH_2$;
  d. C≡C;
  e. $CH_2CH$≡$CHCH_2$; and
  f. $HO(CH_2)_x(-Si[R']_2-O-)_n(CH_2)_xOH$, where x=1–10, n=1 to 1000, methyl, phenyl, ethyl, propyl, butyl, and any mixture of these groups.

48. The method as claimed in claim 46, wherein the diol is selected from the group consisting of ethylene glycol, 1,3-propane diol, 1,4-butanediol, 1,5-pentanediol, 1,6-hexanediol, 1,8-octanediol, 1,12-dodacanediol.

49. The method as claimed in claim 46, wherein the diols comprise as side groups or along the chain carbon-carbon double or triple bonds, ketones, esters, nitriles, isonitriles, nitrates, sulfates and silicones.

50. The method as claimed in claim 28, wherein the diacid is an aliphatic dicarboxylic acid.

51. The method as claimed in claim 46, wherein the aliphatic diacid has the structure HOOC—R—COOH where R is selected from the group consisting of;
   a. $(CH_2)_n$, where n=1–32;
   b. $(CH_2)_n CH_x(R_1)(R_2)(CH_2)_m$, where $R_1$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family, and where $R_1$ may be along the chain, a pendant group that is attached directly to carbon that is along the chain, attached indirectly to the main chain through a spacer group: $R_2$=hydrogen, keto, nitrile, halogen, thiol, disubstituted amines, trisubstituted amines, tetrasubstituted amines, carboxylic acid, hydroxyl group, acetal, ether, alkene, alkyne, isonitrile, nitrates, sulfates, phosphates, phosphoesters, and general members of the silicone family; n=0–32; m=0–32; and x=0–2;
   c. CH=CH;
   d. $CH_2CH=CHCH_2$; and
   e. $(CH_2)_x(-Si[R']_2-O-)_n(CH_2)_x$, where x=1–10, n=1 to 1000, and R'=methyl, phenyl, ethyl, propyl, butyl, and any mixture of these groups.

52. The method as claimed in claim 51, wherein the R-groups may include as side groups or along the main chain carbon double or triple bonds, ketones, esters, nitriles, isonitriles, nitrates, sulfates, phosphates and silicones.

53. The method as claimed in claim 28, wherein the polyol is selected from the group consisting of glycerol, erythritol, pentaerythritol, xylitol, ribitol, sorbitol, 1,2,6 hexane triol, 1,2,4-butanetriol, maltose, sucrose, and lactose.

54. The method as claimed in claim 36, wherein the lactone is selected from the group consisting of lactones with 4 to 16 membered rings.

55. The method as claimed in claim 54, wherein the lactone is selected from the group consisting of butyrolactone, δ-valerolactone, ε-caprolactone, β-octanolide, ω-dodecanolide, ω-pentadecalactone, lactide, dioxanone and glycolide.

56. The method as claimed in claim 36, wherein the carbonate is selected from the group consisting of trimethylene carbonate, 1-methyltrimethylene carbonate, 1,3-dimethyltrimethylenecarbonate, 2,2-dimethyltrimethylenecarbonate, 1,2-O-isopropylidene-[D]-xylofuranose-3,5-cyclic carbonate, and 1,2-isopropylidene glucofuranose -4,4-bishydroxymethyl cyclic carbonate.

57. The method as claimed in claim 28, wherein the enzyme is selected from the group consisting of lipases, proteases and esterases.

58. The method as claimed in claim 57, wherein the enzyme is selected from the group consisting of Novozyme435 (*Candida antarctica* Lipase B), Lipase IM (*Mucor meihei*), PS-30 (*Pseudomonas Cepacia*), PA (*Pseudomonas aeruginosa*, Lipase PF (*Pseudomonas fluoresenses*), lipase from *Candida cylinderacea*, porcine pancreatic lipase and the lipase from *Aspergillus niger*. Proteases such as α-Chymotrypsin Type II from bovine pancreas, papain, pepsin from porcine stomach mucosa, Protease Type XIII from *Aspergillus saitoi*, Protease (Pronase E) Type XIV from *Stroptomyces griseus*, Protease Type VIII (Subtilisin Carlsberg) from *Bacillus lichenifomis*, and Protease Type X (Thermolysin) from *Bacillus thermoproteolyticus rokko*, and Protease Type XXVII (Nagarse).

59. A method to prepare polyester-containing polymers using enzymatic polycondensation comprising the steps of:
   a. selecting at least two monomers from the group comprising diols, diacids, polyols, hydroxylacids, carbonates, cyclic carbonates, lactones, anhydrides, and combinations thereof; and
   b. combining the selected the monomers and an enzyme in a reaction vessel and allowing a polycondensation reaction to proceed for a defined time period resulting in a desired polyester containing-polymer,
   wherein the enzymatic reaction occurs in the absence of solvent and proceeds as a direct reaction.

60. A sugar-containing copolymer produced using a method comprising the steps of:
   a. combining a preselected quantity of an enzyme, at least one compound selected from the group consisting of diols and polyols, and a diacid in a reaction vessel;
   b. heating the reaction vessel containing the enzyme, the diol and/or polyol, and the diacid to a preselected temperature; and
   c. maintaining the reaction vessel containing the enzyme, the diol and/or polyol, and the diacid at the preselected temperature for a preselected time,
   thereby producing the sugar-containing copolymer.

61. A semi-crystalline thermoplastic produced using a method comprising the steps of:
   a. combining a preselected quantity of an enzyme, at least one compound selected from the group consisting of diols and polyols, and a diacid in a reaction vessel;
   b. heating the reaction vessel containing the enzyme, the diol and/or polyol, and the diacid to a preselected temperature; and
   c. maintaining the reaction vessel containing the enzyme, the diol and/or polyol, and the diacid at the preselected temperature for a preselected time,
   thereby producing the semi-crystalline thermoplastic.

62. A sugar-containing polyester produced using a method comprising the steps of:
   a. combining a preselected quantity of an enzyme, at least one compound selected from the group consisting of diols and polyols, and a diacid in a reaction vessel;
   b. heating the reaction vessel containing the enzyme, the diol and/or polyol, and the diacid to a preselected temperature; and
   c. maintaining the reaction vessel containing the enzyme, the diol and/or polyol, and the diacid at the preselected temperature for a preselected time,
   thereby producing the sugar-containing polyester.

63. The sugar-containing polyester as claimed in claim 65 comprising as repeat units at least one residue selected from the group consisting of oxalic acid, lactic acid, and glycolic acid.

64. A polyurethane produced using a method comprising the steps of:
   a. combining a preselected quantity of an enzyme, at least one compound selected from the group consisting of diols and polyols, and a diacid in a reaction vessel;
   b. heating the reaction vessel containing the enzyme, the diol and/or polyol, and the diacid to a preselected temperature; and c. maintaining the reaction vessel containing the enzyme, the diol and/or polyol, and the diacid at the preselected temperature for a preselected time, thereby producing the polyurethane.

65. A sugar-containing copolymer produced using a method comprising the steps of:
   a. adding a diol to a reaction vessel;
   b. adding a diacid to the reaction vessel containing the diol;
   c. adding an enzyme to the reaction vessel containing the diol and the diacid;
   d. maintaining the reaction vessel containing the diol, the diacid and the enzyme at a preselected temperature for a preselected time, thereby producing the sugar-containing copolymer.

66. A semi-crystalline thermoplastic produced using a method comprising the steps of:
   a. adding a diol to a reaction vessel;
   b. adding a diacid to the reaction vessel containing the diol;
   c. adding an enzyme to the reaction vessel containing the diol and the diacid;
   d. maintaining the reaction vessel containing the diol, the diacid and the enzyme at a preselected temperature for a preselected time, thereby producing the semi-crystalline thermoplastic.

67. A sugar-containing polyester produced using a method comprising the steps of:
   a. adding a diol to a reaction vessel:
   b. adding a diacid to the reaction vessel containing the diol;
   c. adding an enzyme to the reaction vessel containing the diol and the diacid;
   d. maintaining the reaction vessel containing the diol, the diacid and the enzyme at a preselected temperature for a preselected time, thereby producing the sugar-containing polyester.

68. The sugar-containing polyester as claimed in claim 67 comprising as repeat units at least one residue selected from the group consisting of oxalic acid, lactic acid, and glycolic acid.

69. A polyurethane produced using a method comprising the steps of:
   a. adding a diol to a reaction vessel;
   b. adding a diacid to the reaction vessel containing the diol;
   c. adding an enzyme to the reaction vessel containing the diol and the diacid;
   d. maintaining the reaction vessel containing the diol, the diacid and the enzyme at a preselected temperature for a preselected time, thereby producing the polyurethane.

* * * * *